(12) United States Patent
Dokai et al.

(10) Patent No.: US 8,937,576 B2
(45) Date of Patent: Jan. 20, 2015

(54) WIRELESS COMMUNICATION DEVICE

(71) Applicant: Murata Manufacturing Co., Ltd., Nagaokakyo-shi, Kyoto-fu (JP)

(72) Inventors: Yuya Dokai, Nagaokakyo (JP); Tsuyoshi Mukai, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 53 days.

(21) Appl. No.: 13/782,346

(22) Filed: Mar. 1, 2013

(65) Prior Publication Data
US 2013/0176184 A1   Jul. 11, 2013

Related U.S. Application Data

(63) Continuation of application No. PCT/JP2012/058884, filed on Apr. 2, 2012.

(30) Foreign Application Priority Data

Apr. 5, 2011 (JP) ................. 2011-083277

(51) Int. Cl.
*H01Q 1/38* (2006.01)
*H01Q 1/22* (2006.01)
(Continued)

(52) U.S. Cl.
CPC ............... *H01Q 1/38* (2013.01); *H01Q 1/2225* (2013.01); *H01Q 9/285* (2013.01); *G06K 19/07786* (2013.01); *H01Q 1/20* (2013.01)
USPC .......................................... 343/749; 343/795

(58) Field of Classification Search
CPC ......... H01Q 1/38; H01Q 1/2225; H01Q 1/20; H01Q 9/285

USPC .......................... 343/795, 700 MS, 702, 749
See application file for complete search history.

(56) References Cited

U.S. PATENT DOCUMENTS

| 3,364,564 A | 1/1968 | Kurtz et al. |
| 4,794,397 A | 12/1988 | Ohe et al. |

(Continued)

FOREIGN PATENT DOCUMENTS

| CA | 2 279 176 A1 | 7/1998 |
| CN | 101351924 A | 1/2009 |

(Continued)

OTHER PUBLICATIONS

Official Communication issued in International Patent Application No. PCT/JP2011/068110, mailed on Sep. 20, 2011.

(Continued)

*Primary Examiner* — Hoanganh Le
(74) *Attorney, Agent, or Firm* — Keating & Bennett, LLP

(57) ABSTRACT

A wireless communication device includes a flexible base material film, a flexible antenna conductor that is provided in substantially the entire region of one main surface of the flexible base material film and that includes a first radiation element and a second radiation element facing each other through a slit, an inductor substrate that is connected to the first radiation element and the second radiation element so as to extend across the slit, the inductor substrate including an inductance element, and a wireless IC element that is connected in parallel to the inductance element and that is mounted in the inductor substrate. The wireless IC element is connected to the first radiation element and the second radiation element so as to extend across the slit.

19 Claims, 19 Drawing Sheets

(51) Int. Cl.
*H01Q 9/28* (2006.01)
*G06K 19/077* (2006.01)
*H01Q 1/20* (2006.01)

(56) References Cited

U.S. PATENT DOCUMENTS

| | | | |
|---|---|---|---|
| 5,232,765 | A | 8/1993 | Yano et al. |
| 5,253,969 | A | 10/1993 | Richert |
| 5,337,063 | A | 8/1994 | Takahira |
| 5,374,937 | A | 12/1994 | Tsunekawa et al. |
| 5,399,060 | A | 3/1995 | Richert |
| 5,491,483 | A | 2/1996 | D'Hont |
| 5,528,222 | A | 6/1996 | Moskowitz et al. |
| 5,757,074 | A | 5/1998 | Matloubian et al. |
| 5,854,480 | A | 12/1998 | Noto |
| 5,903,239 | A | 5/1999 | Takahashi et al. |
| 5,936,150 | A | 8/1999 | Kobrin et al. |
| 5,955,723 | A | 9/1999 | Reiner |
| 5,995,006 | A | 11/1999 | Walsh |
| 6,018,324 | A * | 1/2000 | Kitchener .................... 343/795 |
| 6,104,311 | A | 8/2000 | Lastinger |
| 6,107,920 | A | 8/2000 | Eberhardt et al. |
| 6,172,608 | B1 | 1/2001 | Cole |
| 6,181,287 | B1 | 1/2001 | Beigel |
| 6,190,942 | B1 | 2/2001 | Wilm et al. |
| 6,243,045 | B1 | 6/2001 | Ishibashi |
| 6,249,258 | B1 | 6/2001 | Bloch et al. |
| 6,259,369 | B1 | 7/2001 | Monico |
| 6,271,803 | B1 | 8/2001 | Watanabe et al. |
| 6,335,686 | B1 | 1/2002 | Goff et al. |
| 6,362,784 | B1 | 3/2002 | Kane et al. |
| 6,367,143 | B1 | 4/2002 | Sugimura |
| 6,378,774 | B1 | 4/2002 | Emori et al. |
| 6,406,990 | B1 | 6/2002 | Kawai |
| 6,448,874 | B1 | 9/2002 | Shiino et al. |
| 6,452,563 | B1 | 9/2002 | Porte |
| 6,462,716 | B1 | 10/2002 | Kushihi |
| 6,542,050 | B1 | 4/2003 | Arai et al. |
| 6,600,459 | B2 | 7/2003 | Yokoshima et al. |
| 6,634,564 | B2 | 10/2003 | Kuramochi |
| 6,664,645 | B2 | 12/2003 | Kawai |
| 6,763,254 | B2 | 7/2004 | Nishikawa |
| 6,812,707 | B2 | 11/2004 | Yonezawa et al. |
| 6,828,881 | B2 | 12/2004 | Mizutani et al. |
| 6,837,438 | B1 | 1/2005 | Takasugi et al. |
| 6,861,731 | B2 | 3/2005 | Buijsman et al. |
| 6,927,738 | B2 | 8/2005 | Senba et al. |
| 6,956,481 | B1 | 10/2005 | Cole |
| 6,963,729 | B2 | 11/2005 | Uozumi |
| 7,088,249 | B2 | 8/2006 | Senba et al. |
| 7,088,307 | B2 | 8/2006 | Imaizumi |
| 7,112,952 | B2 | 9/2006 | Arai et al. |
| 7,119,693 | B1 | 10/2006 | Devilbiss |
| 7,129,834 | B2 | 10/2006 | Naruse et al. |
| 7,248,221 | B2 | 7/2007 | Kai et al. |
| 7,250,910 | B2 | 7/2007 | Yoshikawa et al. |
| 7,276,929 | B2 | 10/2007 | Arai et al. |
| 7,317,396 | B2 | 1/2008 | Ujino |
| 7,405,664 | B2 | 7/2008 | Sakama et al. |
| 2001/0011012 | A1 | 8/2001 | Hino et al. |
| 2002/0011967 | A1 | 1/2002 | Goff et al. |
| 2002/0015002 | A1 | 2/2002 | Yasukawa et al. |
| 2002/0044092 | A1 | 4/2002 | Kushihi |
| 2002/0067316 | A1 | 6/2002 | Yokoshima et al. |
| 2002/0093457 | A1 | 7/2002 | Hamada et al. |
| 2003/0006901 | A1 | 1/2003 | Kim et al. |
| 2003/0020661 | A1 | 1/2003 | Sato |
| 2003/0045324 | A1 | 3/2003 | Nagumo et al. |
| 2003/0169153 | A1 | 9/2003 | Muller |
| 2004/0001027 | A1 | 1/2004 | Killen et al. |
| 2004/0026519 | A1 | 2/2004 | Usami et al. |
| 2004/0056823 | A1 | 3/2004 | Zuk et al. |
| 2004/0066617 | A1 | 4/2004 | Hirabayashi et al. |
| 2004/0217915 | A1 | 11/2004 | Imaizumi |
| 2004/0219956 | A1 | 11/2004 | Iwai et al. |
| 2004/0227673 | A1 | 11/2004 | Iwai et al. |
| 2004/0252064 | A1 | 12/2004 | Yuanzhu |
| 2005/0001031 | A1 | 1/2005 | Akiho et al. |
| 2005/0092836 | A1 | 5/2005 | Kudo |
| 2005/0099337 | A1 | 5/2005 | Takei et al. |
| 2005/0125093 | A1 | 6/2005 | Kikuchi et al. |
| 2005/0134460 | A1 | 6/2005 | Usami |
| 2005/0134506 | A1 | 6/2005 | Egbert |
| 2005/0138798 | A1 | 6/2005 | Sakama et al. |
| 2005/0140512 | A1 | 6/2005 | Sakama et al. |
| 2005/0232412 | A1 | 10/2005 | Ichihara et al. |
| 2005/0236623 | A1 | 10/2005 | Takechi et al. |
| 2005/0237255 | A1 * | 10/2005 | Zhang et al. .................. 343/795 |
| 2005/0253726 | A1 | 11/2005 | Yoshida et al. |
| 2005/0275539 | A1 | 12/2005 | Sakama et al. |
| 2006/0001138 | A1 | 1/2006 | Sakama et al. |
| 2006/0032926 | A1 | 2/2006 | Baba et al. |
| 2006/0044192 | A1 | 3/2006 | Egbert |
| 2006/0055531 | A1 | 3/2006 | Cook et al. |
| 2006/0055601 | A1 | 3/2006 | Kameda et al. |
| 2006/0071084 | A1 | 4/2006 | Detig et al. |
| 2006/0109185 | A1 | 5/2006 | Iwai et al. |
| 2006/0145872 | A1 | 7/2006 | Tanaka et al. |
| 2006/0158380 | A1 | 7/2006 | Son et al. |
| 2006/0170606 | A1 | 8/2006 | Yamagajo et al. |
| 2006/0214801 | A1 | 9/2006 | Murofushi et al. |
| 2006/0220871 | A1 | 10/2006 | Baba et al. |
| 2006/0244568 | A1 | 11/2006 | Tong et al. |
| 2006/0244676 | A1 | 11/2006 | Uesaka |
| 2006/0267138 | A1 | 11/2006 | Kobayashi |
| 2007/0004028 | A1 | 1/2007 | Lair et al. |
| 2007/0015549 | A1 | 1/2007 | Hernandez et al. |
| 2007/0018893 | A1 | 1/2007 | Kai et al. |
| 2007/0040028 | A1 | 2/2007 | Kawamata |
| 2007/0052613 | A1 | 3/2007 | Gallschuetz et al. |
| 2007/0057854 | A1 | 3/2007 | Oodachi et al. |
| 2007/0069037 | A1 | 3/2007 | Kawai |
| 2007/0132591 | A1 | 6/2007 | Khatri |
| 2007/0164414 | A1 | 7/2007 | Dokai et al. |
| 2007/0200705 | A1 | 8/2007 | Yamagajo et al. |
| 2007/0200782 | A1 | 8/2007 | Hayama et al. |
| 2007/0229276 | A1 | 10/2007 | Yamagajo et al. |
| 2007/0247387 | A1 | 10/2007 | Kubo et al. |
| 2007/0252700 | A1 | 11/2007 | Ishihara et al. |
| 2007/0252703 | A1 | 11/2007 | Kato et al. |
| 2007/0252763 | A1 | 11/2007 | Martin |
| 2007/0252770 | A1 | 11/2007 | Kai et al. |
| 2007/0285335 | A1 | 12/2007 | Bungo et al. |
| 2007/0290928 | A1 | 12/2007 | Chang et al. |
| 2008/0024156 | A1 | 1/2008 | Arai et al. |
| 2008/0068132 | A1 | 3/2008 | Kayanakis et al. |
| 2008/0070003 | A1 | 3/2008 | Nakatani et al. |
| 2008/0087990 | A1 | 4/2008 | Kato et al. |
| 2008/0129606 | A1 | 6/2008 | Yanagisawa et al. |
| 2008/0143630 | A1 | 6/2008 | Kato et al. |
| 2008/0169905 | A1 | 7/2008 | Slatter |
| 2008/0180217 | A1 | 7/2008 | Isabell |
| 2008/0184281 | A1 | 7/2008 | Ashizaki et al. |
| 2008/0272885 | A1 | 11/2008 | Atherton |
| 2009/0002130 | A1 | 1/2009 | Kato |
| 2009/0009007 | A1 | 1/2009 | Kato et al. |
| 2009/0021352 | A1 | 1/2009 | Kataya et al. |
| 2009/0021446 | A1 | 1/2009 | Kataya et al. |
| 2009/0065594 | A1 | 3/2009 | Kato et al. |
| 2009/0066466 | A1 | 3/2009 | Arimura |
| 2009/0096696 | A1 | 4/2009 | Joyce, Jr. et al. |
| 2009/0109034 | A1 | 4/2009 | Chen et al. |
| 2009/0109102 | A1 | 4/2009 | Dokai et al. |
| 2009/0140947 | A1 | 6/2009 | Sasagawa et al. |
| 2009/0160719 | A1 | 6/2009 | Kato et al. |
| 2009/0201116 | A1 | 8/2009 | Orihara |
| 2009/0224061 | A1 | 9/2009 | Kato et al. |
| 2009/0231106 | A1 | 9/2009 | Okamura |
| 2009/0262041 | A1 | 10/2009 | Ikemoto et al. |
| 2009/0266900 | A1 | 10/2009 | Ikemoto et al. |
| 2009/0278687 | A1 | 11/2009 | Kato |
| 2009/0284220 | A1 | 11/2009 | Toncich et al. |
| 2009/0321527 | A1 | 12/2009 | Kato et al. |
| 2010/0103058 | A1 | 4/2010 | Kato et al. |

(56) References Cited

U.S. PATENT DOCUMENTS

| | | | |
|---|---|---|---|
| 2010/0182210 A1 | 7/2010 | Ryou et al. | |
| 2010/0283694 A1 | 11/2010 | Kato | |
| 2010/0308118 A1 | 12/2010 | Kataya et al. | |
| 2011/0031320 A1 | 2/2011 | Kato et al. | |
| 2011/0063184 A1 | 3/2011 | Furumura et al. | |
| 2011/0186641 A1 | 8/2011 | Kato et al. | |
| 2011/0253795 A1 | 10/2011 | Kato | |

FOREIGN PATENT DOCUMENTS

| | | | |
|---|---|---|---|
| CN | 101578616 A | 11/2009 | |
| DE | 10 2006 057 369 A1 | 6/2008 | |
| EP | 0 694 874 A2 | 1/1996 | |
| EP | 0 848 448 A2 | 6/1998 | |
| EP | 0 948 083 A2 | 10/1999 | |
| EP | 0 977 145 A2 | 2/2000 | |
| EP | 1 010 543 A1 | 6/2000 | |
| EP | 1 085 480 A1 | 3/2001 | |
| EP | 1 160 915 A2 | 12/2001 | |
| EP | 1 170 795 A2 | 1/2002 | |
| EP | 1 193 793 A2 | 4/2002 | |
| EP | 1 227 540 A1 | 7/2002 | |
| EP | 1 280 232 A1 | 1/2003 | |
| EP | 1 280 350 A1 | 1/2003 | |
| EP | 1 343 223 A1 | 9/2003 | |
| EP | 1 357 511 A2 | 10/2003 | |
| EP | 1 547 753 A1 | 6/2005 | |
| EP | 1 548 872 A1 | 6/2005 | |
| EP | 1 626 364 A2 | 2/2006 | |
| EP | 1 701 296 A1 | 9/2006 | |
| EP | 1 703 589 A1 | 9/2006 | |
| EP | 1 742 296 A1 | 1/2007 | |
| EP | 1 744 398 A1 | 1/2007 | |
| EP | 1 840 802 A1 | 10/2007 | |
| EP | 1 841 005 A1 | 10/2007 | |
| EP | 1 865 574 A1 | 12/2007 | |
| EP | 1 887 652 A1 | 2/2008 | |
| EP | 1 976 056 A1 | 10/2008 | |
| EP | 1 988 491 A1 | 11/2008 | |
| EP | 1 988 601 A1 | 11/2008 | |
| EP | 1 993 170 A1 | 11/2008 | |
| EP | 2 009 738 A1 | 12/2008 | |
| EP | 2 012 258 A1 | 1/2009 | |
| EP | 2 096 709 A1 | 9/2009 | |
| EP | 2 148 449 A1 | 1/2010 | |
| EP | 2 166 617 A1 | 3/2010 | |
| EP | 2 251 934 A1 | 11/2010 | |
| EP | 2 256 861 A1 | 12/2010 | |
| EP | 2 330 684 A1 | 6/2011 | |
| GB | 2 305 075 A | 3/1997 | |
| GB | 2461443 A | 1/2010 | |
| JP | 50-143451 A | 11/1975 | |
| JP | 61-284102 A | 12/1986 | |
| JP | 62-127140 U | 8/1987 | |
| JP | 01-212035 A | 8/1989 | |
| JP | 02-164105 A | 6/1990 | |
| JP | 02-256208 A | 10/1990 | |
| JP | 3-171385 A | 7/1991 | |
| JP | 03-503467 A | 8/1991 | |
| JP | 03-262313 A | 11/1991 | |
| JP | 04-150011 A | 5/1992 | |
| JP | 04-167500 A | 6/1992 | |
| JP | 04-096814 U | 8/1992 | |
| JP | 04-101168 U | 9/1992 | |
| JP | 04-134807 U | 12/1992 | |
| JP | 05-226926 A | 9/1993 | |
| JP | 05-327331 A | 12/1993 | |
| JP | 6-53733 U | 2/1994 | |
| JP | 06-077729 A | 3/1994 | |
| JP | 06-029215 U | 4/1994 | |
| JP | 06-177635 A | 6/1994 | |
| JP | 6-260949 A | 9/1994 | |
| JP | 07-183836 A | 7/1995 | |
| JP | 08-055725 A | 2/1996 | |
| JP | 08-056113 A | 2/1996 | |
| JP | 8-87580 | 4/1996 | |
| JP | 08-088586 A | 4/1996 | |
| JP | 08-88586 A | 4/1996 | |
| JP | 08-176421 A | 7/1996 | |
| JP | 08-180160 A | 7/1996 | |
| JP | 08-279027 A | 10/1996 | |
| JP | 08-307126 A | 11/1996 | |
| JP | 08-330372 A | 12/1996 | |
| JP | 09-014150 A | 1/1997 | |
| JP | 09-035025 A | 2/1997 | |
| JP | 09-093029 A | 4/1997 | |
| JP | 9-93029 A | 4/1997 | |
| JP | 09-245381 A | 9/1997 | |
| JP | 09-252217 A | 9/1997 | |
| JP | 09-270623 A | 10/1997 | |
| JP | 09-284038 A | 10/1997 | |
| JP | 09-294374 A | 11/1997 | |
| JP | 9-512367 A | 12/1997 | |
| JP | 10-069533 A | 3/1998 | |
| JP | 10-69533 A | 3/1998 | |
| JP | 10-505466 A | 5/1998 | |
| JP | 10-171954 A | 6/1998 | |
| JP | 10-173427 A | 6/1998 | |
| JP | 10-193849 A | 7/1998 | |
| JP | 10-193851 A | 7/1998 | |
| JP | 10-242742 A | 9/1998 | |
| JP | 10-293828 A | 11/1998 | |
| JP | 10-334203 A | 12/1998 | |
| JP | 11-025244 A | 1/1999 | |
| JP | 11-039441 A | 2/1999 | |
| JP | 11-075329 A | 3/1999 | |
| JP | 11-085937 A | 3/1999 | |
| JP | 11-88241 A | 3/1999 | |
| JP | 11-102424 A | 4/1999 | |
| JP | 11-103209 A | 4/1999 | |
| JP | 11-149536 A | 6/1999 | |
| JP | 11-149537 A | 6/1999 | |
| JP | 11-149538 A | 6/1999 | |
| JP | 11-175678 A | 7/1999 | |
| JP | 11-219420 A | 8/1999 | |
| JP | 11-220319 A | 8/1999 | |
| JP | 11-282993 A | 10/1999 | |
| JP | 11-328352 A | 11/1999 | |
| JP | 11-331014 A | 11/1999 | |
| JP | 11-346114 A | 12/1999 | |
| JP | 11-515094 A | 12/1999 | |
| JP | 2000-21128 A | 1/2000 | |
| JP | 2000-021639 A | 1/2000 | |
| JP | 2000-022421 A | 1/2000 | |
| JP | 2000-048152 A | 2/2000 | |
| JP | 2000-059260 A | 2/2000 | |
| JP | 2000-085283 A | 3/2000 | |
| JP | 2000-090207 A | 3/2000 | |
| JP | 2000-132643 A | 5/2000 | |
| JP | 2000-137778 A | 5/2000 | |
| JP | 2000-137779 A | 5/2000 | |
| JP | 2000-137785 A | 5/2000 | |
| JP | 2000-148948 A | 5/2000 | |
| JP | 2000-172812 A | 6/2000 | |
| JP | 2000-209013 A | 7/2000 | |
| JP | 2000-222540 A | 8/2000 | |
| JP | 2000-510271 A | 8/2000 | |
| JP | 2000-242754 A | 9/2000 | |
| JP | 2000-243797 A | 9/2000 | |
| JP | 2000-251049 A | 9/2000 | |
| JP | 2000-261230 A | 9/2000 | |
| JP | 2000-276569 A | 10/2000 | |
| JP | 2000-286634 A | 10/2000 | |
| JP | 2000-286760 A | 10/2000 | |
| JP | 2000-311226 A | 11/2000 | |
| JP | 2000-321984 A | 11/2000 | |
| JP | 2000-349680 A | 12/2000 | |
| JP | 2001-10264 A | 1/2001 | |
| JP | 2001-028036 A | 1/2001 | |
| JP | 2001-043340 A | 2/2001 | |
| JP | 3075400 U | 2/2001 | |
| JP | 2001-66990 A | 3/2001 | |
| JP | 2001-76111 A | 3/2001 | |

(56) References Cited

FOREIGN PATENT DOCUMENTS

| | | |
|---|---|---|
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-209767 A | 8/2001 |
| JP | 2001-240046 A | 9/2001 |
| JP | 2001-240217 A | 9/2001 |
| JP | 2001-256457 A | 9/2001 |
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-042083 A | 2/2002 |
| JP | 2002-063557 A | 2/2002 |
| JP | 2002-505645 A | 2/2002 |
| JP | 2002-76750 A | 3/2002 |
| JP | 2002-076750 A | 3/2002 |
| JP | 2002-111363 A | 4/2002 |
| JP | 2002-143826 A | 5/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-175920 A | 6/2002 |
| JP | 2002-183676 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-222398 A | 8/2002 |
| JP | 2002-230128 A | 8/2002 |
| JP | 2002-232221 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-290130 A | 10/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-325013 A | 11/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-308363 A | 10/2003 |
| JP | 2003-309418 A | 10/2003 |
| JP | 2003-317055 A | 11/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-126750 A | 4/2004 |
| JP | 2004-127230 A | 4/2004 |
| JP | 2004-140513 A | 5/2004 |
| JP | 2004-145449 A | 5/2004 |
| JP | 2004-163134 A | 6/2004 |
| JP | 2004-166176 A | 6/2004 |
| JP | 2004-213582 A | 7/2004 |
| JP | 2004-519916 A | 7/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-033461 A | 2/2005 |
| JP | 2005-050581 A | 2/2005 |
| JP | 2005-064799 A | 3/2005 |
| JP | 2005-124061 A | 5/2005 |
| JP | 2005-128592 A | 5/2005 |
| JP | 2005-129019 A | 5/2005 |
| JP | 2005-134942 A | 5/2005 |

(56) References Cited

FOREIGN PATENT DOCUMENTS

| | | |
|---|---|---|
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-204038 A | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-277579 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |
| JP | 2005-306696 A | 11/2005 |
| JP | 2005-311205 A | 11/2005 |
| JP | 2005-321305 A | 11/2005 |
| JP | 2005-322119 A | 11/2005 |
| JP | 2005-327622 A | 11/2005 |
| JP | 2005-333244 A | 12/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-13976 A | 1/2006 |
| JP | 2006-013976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-013120 A | 1/2007 |
| JP | 2007-13120 A | 1/2007 |
| JP | 2007-18067 A | 1/2007 |
| JP | 2007-019905 A | 1/2007 |
| JP | 2007-28002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096655 A | 4/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-149757 A | 6/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 3975918 B2 | 6/2007 |
| JP | 2007-172369 A | 7/2007 |
| JP | 2007-172527 A | 7/2007 |
| JP | 2007-524942 A | 8/2007 |
| JP | 2007-228254 A | 9/2007 |
| JP | 2007-228325 A | 9/2007 |
| JP | 2007-228437 A | 9/2007 |
| JP | 2007-233597 A | 9/2007 |
| JP | 2007-241789 A | 9/2007 |
| JP | 2007-249620 A | 9/2007 |
| JP | 2007-266999 A | 10/2007 |
| JP | 2007-272264 A | 10/2007 |
| JP | 2007-287128 A | 11/2007 |
| JP | 2007-295177 A | 11/2007 |
| JP | 2007-295395 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-042910 A | 2/2008 |
| JP | 2008-72243 A | 3/2008 |
| JP | 2008-083867 A | 4/2008 |
| JP | 2008-092131 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-513888 A | 5/2008 |
| JP | 2008-148345 A | 6/2008 |
| JP | 2008-519347 A | 6/2008 |
| JP | 2008-160821 A | 7/2008 |
| JP | 2008-160874 A | 7/2008 |
| JP | 2008-167190 A | 7/2008 |
| JP | 2008-182438 A | 8/2008 |
| JP | 2008-197714 A | 8/2008 |
| JP | 2008-535372 A | 8/2008 |
| JP | 2008-207875 A | 9/2008 |
| JP | 2008-217406 A | 9/2008 |
| JP | 2008-226099 A | 9/2008 |
| JP | 2008-252517 A | 10/2008 |
| JP | 2008-288915 A | 11/2008 |
| JP | 2008-294491 A | 12/2008 |
| JP | 2009-017284 A | 1/2009 |
| JP | 2009-021970 A | 1/2009 |
| JP | 2009-25870 A | 2/2009 |
| JP | 2009-027291 A | 2/2009 |
| JP | 2009-27291 A | 2/2009 |
| JP | 2009-037413 A | 2/2009 |
| JP | 2009-044647 A | 2/2009 |
| JP | 2009-044715 A | 2/2009 |
| JP | 3148168 U | 2/2009 |
| JP | 2009-065426 A | 3/2009 |

(56) References Cited

FOREIGN PATENT DOCUMENTS

| | | |
|---|---|---|
| JP | 2009-110144 A | 5/2009 |
| JP | 2009-111986 A | 5/2009 |
| JP | 2009-135166 A | 6/2009 |
| JP | 2009-153166 A | 7/2009 |
| JP | 2009-182630 A | 8/2009 |
| JP | 2009-213169 A | 9/2009 |
| JP | 2009-213171 A | 9/2009 |
| JP | 2009-260758 A | 11/2009 |
| JP | 2009-284182 A | 12/2009 |
| JP | 2010-009196 A | 1/2010 |
| JP | 2010-050844 A | 3/2010 |
| JP | 2010-081571 | 4/2010 |
| JP | 4609604 B2 | 1/2011 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 20041072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/049068 A1 | 5/2006 |
| WO | 2006/114821 A1 | 11/2006 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/100092 A1 | 9/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/008296 A1 | 1/2009 |
| WO | 2009/011144 A1 | 1/2009 |
| WO | 2009/011154 A1 | 1/2009 |
| WO | 2009/011376 A1 | 1/2009 |
| WO | 2009/011400 A1 | 1/2009 |
| WO | 2009/011423 A1 | 1/2009 |
| WO | 20091011376 A1 | 1/2009 |
| WO | 2009/048767 A1 | 4/2009 |
| WO | 2009/081719 A1 | 7/2009 |
| WO | 2009/110381 A1 | 9/2009 |
| WO | 2009/119548 A1 | 10/2009 |
| WO | 2009/128437 A1 | 10/2009 |
| WO | 2009/140220 A1 | 11/2009 |
| WO | 2009/142114 A1 | 11/2009 |
| WO | 2010/026939 A1 | 3/2010 |
| WO | 2010/050361 A1 | 5/2010 |
| WO | 2010/079830 A1 | 7/2010 |

OTHER PUBLICATIONS

Dokai et al.: "Antenna and Wireless Communication Device"; U.S. Appl. No. 13/613,021, filed Sep. 13, 2012.
Takeoka et al.: "Printed Wiring Board and Wireless Communication System"; U.S. Appl. No. 13/616,140, filed Sep. 14, 2012.
Dokai: "Wireless IC Device, Wireless IC Module and Method of Manufacturing Wireless IC Module"; U.S. Appl. No. 13/688,287, filed Nov. 29, 2012.
Official Communication issued in International Patent Application No. PCT/JP2011/067127, mailed on Oct. 18, 2011.
Kato et al.: "Wireless Communication Device and Metal Article"; U.S. Appl. No. 13/691,996, filed Dec. 3, 2012.
Yosui: "Antenna Apparatus and Communication Terminal Instrument"; U.S. Appl. No. 13/706,409, filed Dec. 6, 2012.
Official Communication issued in International Patent Application No. PCT/JP2011/071795, mailed on Dec. 27, 2011.
Dokai et al.: "Wireless IC Device"; U.S. Appl. No. 13/738,143, filed Jan. 10, 2013.
Official Communication issued in International Patent Application No. PCT/JP2011/074009, mailed on Dec. 20, 2011.
Kato et al.: "Electromagnetic-Coupling-Module-Attached Article"; U.S. Appl. No. 13/754,972, filed Jan. 31, 2013.
Kimura et al.: "Electrical Product"; U.S. Appl. No. 13/757,991, filed Feb. 4, 2013.
Nakano et al.: "Communication Terminal Device"; U.S. Appl. No. 13/760,196, filed Feb. 6, 2013.
Official Communication issued in International Patent Application No. PCT/JP2011/073054, mailed on Dec. 20, 2011.
Official Communication issued in International Patent Application No. PCT/JP2011/073490, mailed on Jan. 10, 2012.
Kato et al.: "Antenna Device and Communication Terminal Apparatus"; U.S. Appl. No. 13/761,195, filed Feb. 7, 2013.
Kato et al.: "Antenna Device and Mobile Communication Terminal"; U.S. Appl. No. 13/767,960, filed Feb. 15, 2013.
Official Communication issued in International Patent Application No. PCT/JP2012/058884, mailed on Jun. 12, 2012.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official communication issued in Japanese Application No. 2007-531524, mailed on Sep. 11, 2007.

(56) References Cited

OTHER PUBLICATIONS

Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.: "Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.

(56) References Cited

OTHER PUBLICATIONS

Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Kato: "Wireless IC Device"; U.S. Appl. No. 12/789,610, filed May 28, 2010.

(56) References Cited

OTHER PUBLICATIONS

Kato: "Antenna and RFID Device"; U.S. Appl. No. 13/472,520, filed May 16, 2012.
Kato et al.: "Wireless IC Device and Component for Wireless IC Device"; U.S. Appl. No. 13/540,694, filed Jul. 3, 2012.
Dokai et al.: "Wireless IC Device and Component for Wireless IC Device"; U.S. Appl. No. 13/567,108, filed Aug. 6, 2012.
Dokai et al.: "Wireless IC Device and Component for Wireless IC Device"; U.S. Appl. No. 13/567,109, filed Aug. 6, 2012.
Official Communication issued in International Patent Application No. PCT/JP2011/052594, mailed on May 17, 2011.
Kato et al.: "Wireless IC Device"; U.S. Appl. No. 13/585,866, filed Aug. 15, 2012.
Kato et al.: "Radio Communication Device and Radio Communication Terminal"; U.S. Appl. No. 13/600,256, filed Aug. 31, 2012.
Murayama et al.: "Wireless Communication Module and Wireless Communication Device"; U.S. Appl. No. 13/598,872, filed Aug. 30, 2012.
Official Communication issued in International Patent Application No. PCT/JP2011/069689, mailed on Oct. 4, 2011.
Official Communication issued in corresponding Japanese Patent Application No. 2011-552116, mailed on Apr. 17, 2012.
Tsubaki et al.: "RFID Module and RFID Device"; U.S. Appl. No. 13/603,627, filed Sep. 5, 2012.
Kato et al.: "Antenna Device and Method of Setting Resonant Frequency of Antenna Device"; U.S. Appl. No. 13/604,807, filed Sep. 6, 2012.
Kato et al.: "Antenna Device and Method of Setting Resonant Frequency of Antenna Device"; U.S. Appl. No. 13/604,801, filed Sep. 6, 2012.
Official Communication issued in International Patent Application No. PCT/JP2011/053656, mailed on May 17, 2011.
Official Communication issued in corresponding European Patent Application No. 12768174.0, mailed on Apr. 9, 2014.

\* cited by examiner

WIRELESS COMMUNICATION DEVICE

BACKGROUND OF THE INVENTION

1. Field of the Invention

The present invention relates to a wireless communication device, and more particularly, to a wireless communication device used for communication with a reader/writer in an RFID (Radio Frequency Identification) system.

2. Description of the Related Art

In recent years, as an information management system for articles, an RFID system in which communication between a reader/writer and an RFID tag (also referred to as a wireless communication device) attached to an article is established using a noncontact method and predetermined information is transmitted has been used. As the RFID system, an HF band system in which a high-frequency wave of 13 MHz band is utilized and a UHF band system in which a high-frequency wave of 900 MHz band is utilized are typical examples. In particular, since a communication area is wide and it is possible to collectively read or write a plurality of RFID tags, the UHF band system has drawn attention.

As an RFID tag used for the UHF band system, for example, RFID tags described in Japanese Unexamined Patent Application Publication No. 2007-228437 and Japanese Unexamined Patent Application Publication No. 2007-295395 and equipped with dipole antennae are common. Each of these dipole antennae includes two radiation elements connected to a wireless IC chip, and a matching loop conductor connecting each of the radiation elements. The matching loop conductor is a conductor used to provide an inductance component to the wireless IC chip, and functions as a matching circuit that provides impedance matching between the wireless IC chip and the radiation element.

In recent years, RFID tags that are able to be directly attached to soft articles, such as clothes or gauze have been demanded. Naturally, such tags are required not only to be small and flexible but also to have high resistance to cleaning or folding.

However, such a dipole antenna of the related art as described in Japanese Unexamined Patent Application Publication No. 2007-228437 or Japanese Unexamined Patent Application Publication No. 2007-295395 requires a loop portion defined by a conductor pattern having a narrow line width. Therefore, the dipole antenna of the related art has a problem in that when being attached to linen goods, a fold line is formed in the loop portion at the time of cleaning or folding, which results in disconnection at the fold line. In addition, when the radiation element includes a portion whose line width is narrow, disconnection tends to occur in the narrow portion in the same way.

Furthermore, typically, the wireless IC chip is mounted on a pad for mounting a chip, and the pad and the radiation element are connected to each other through a lead wiring line. Since the lead wiring line also has a narrow line width, the lead wiring line provides another source of disconnection. In particular, since the wireless IC chip includes a semiconductor substrate, such as silicon, when the RFID tag is folded or bent, a stress tends to be concentrated in the peripheral portion of the wireless IC chip, and particularly, in a joint portion between the wireless IC chip and the radiation element, and disconnection tends to occur in this joint portion.

SUMMARY OF THE INVENTION

To overcome the problems described above, preferred embodiments of the present invention provide a wireless communication device in which disconnection is not likely to occur as a result of folding or bending and which has high reliability.

A wireless communication device according to a first preferred embodiment of the present invention includes a flexible base material film, a flexible antenna conductor that is provided in substantially the entire region of one main surface of the flexible base material film and that includes a first radiation element and a second radiation element facing each other through a slit, an inductor substrate that is connected to the first radiation element and the second radiation element so as to cross the slit, the inductor substrate including an inductance element, and a wireless IC element that is connected in parallel to the inductance element and that is mounted in the inductor substrate.

A wireless communication device according to a second preferred embodiment of the present invention includes a flexible base material film, a flexible antenna conductor that is provided in substantially the entire region of one main surface of the flexible base material film and that includes a first radiation element and a second radiation element facing each other through a slit, an inductor substrate that is connected to the first radiation element and the second radiation element so as to cross the slit, the inductor substrate including an inductance element, and a wireless IC element that is connected to the first radiation element and the second radiation element so as to cross the slit and that is connected in parallel to the inductance element.

The inductance element provided in the inductor substrate preferably achieves impedance matching between the wireless IC element and the flexible antenna conductor. The first radiation element and the second radiation element are provided in substantially the entire region of one main surface of the flexible base material film, and the inductor substrate is connected to the first radiation element and the second radiation element so as to cross the slit provided between the first radiation element and the second radiation element. Therefore, in connections between the inductor substrate and the first and second radiation elements, there is no conductor, such as a loop-shaped conductor or a leading conductor, having a narrow line width. In other words, since the radiation elements (conductors) are only provided on the flexible base material film in a surface shape, even if the wireless communication device is folded or bent, disconnection is not likely to occur, and reliability is significantly improved.

According to various preferred embodiments of the present invention, a highly-reliable wireless communication device is obtained in which disconnection is not likely to occur even when the device is folded or bent. In addition, impedance between a wireless IC element and a flexible antenna conductor can be successfully matched.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of a wireless communication device according to the present invention will be described with reference to the accompanying drawings. In addition, in each drawing, the same symbol is assigned to the common component or portion, and redundant descriptions thereof will be omitted.

First Preferred Embodiment

Figure 1A:
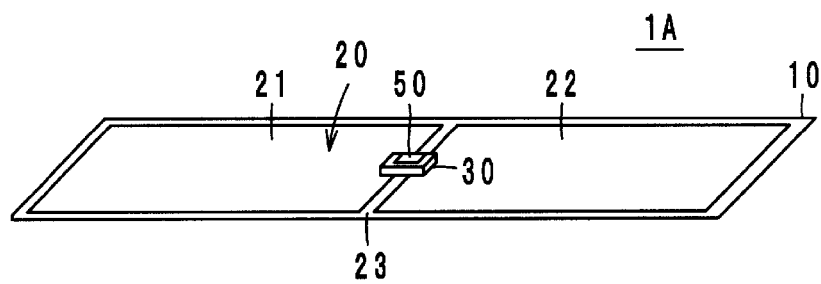
FIGS. 1A to 1C illustrate a wireless communication device according to a first preferred embodiment of the present invention, FIG. 1A being a perspective view, FIG. 1B being a plan view, and FIG. 1C being an enlarged cross-sectional view taken along the line A-A.
Figure 1B:
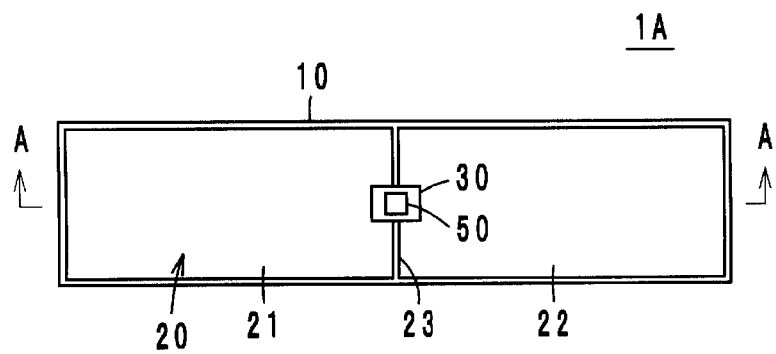
Figure 1C:
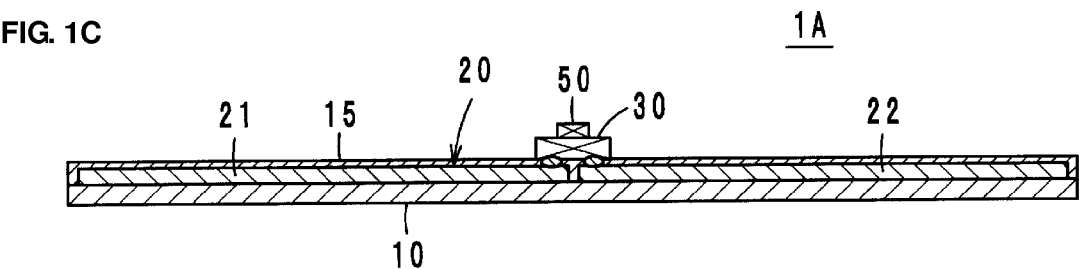

A wireless communication device 1A according to a first preferred embodiment of the present invention is a wireless communication device preferably used for a UHF-band RFID system, for example, and as illustrated in FIGS. 1A to 1C, includes a flexible base material film 10, a flexible antenna conductor 20 provided in substantially the entire region of one main surface of the flexible base material film 10 and including a first radiation element 21 and a second radiation element 22 facing each other with a slit 23 therebetween, an inductor substrate 30 arranged to be connected to portions of the first radiation element 21 and the second radiation element 22 so as to cross the slit 23, the portions linearly facing each other, the inductor substrate 30 including an inductance element L1 (refer to FIG. 2B), and a wireless IC element 50 connected in parallel to the inductance element L1 and mounted in the inductor substrate 30.

As the flexible base material film 10, for example, a polyphenylene sulfide resin or a polyimide resin may preferably be used. As the flexible antenna conductor 20, a metal thin film including, as the primary component thereof, a metal such as, for example, copper or silver, whose specific resistance is small may preferably be used, and a metal foil may be transferred to adhered on the film 10 or the flexible antenna conductor 20 may be formed on the film 10 using a photolithography method, for example. While a margin portion is provided between the circumferential portion of the flexible base material film 10 and the circumferential portion of the antenna conductor 20 (the first radiation element 21 and the second radiation element 22), it is preferable that this margin portion is kept to a minimum. By making the width of the antenna conductor 20 as large as possible, it is possible to improve resistance to folding or bending and reduce the likelihood of the occurrence of disconnection. It is more preferable to eliminate the margin portion altogether. The reason for this is that by maximizing the size of the antenna conductor 20 without increasing the size of the wireless communication device, it is possible to increase the gain of the wireless communication device.

Figure 2A:
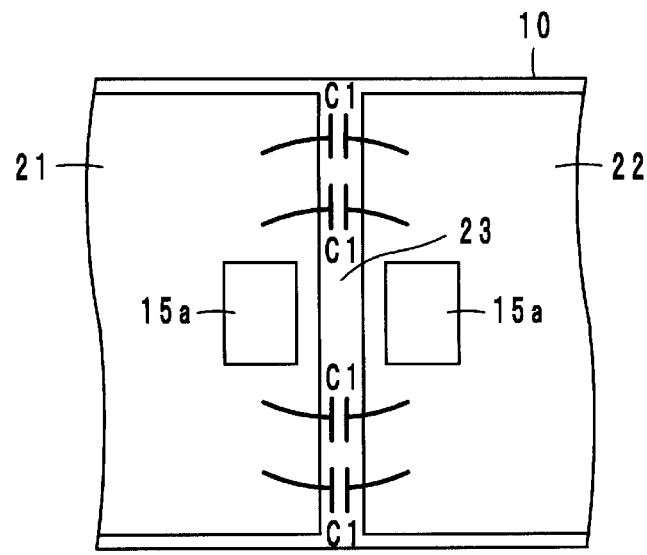
FIGS. 2A and 2B illustrate a main portion of the wireless communication device according to the first preferred embodiment of the present invention, FIG. 2A being a plan view, and FIG. 2B being a cross-sectional view.
Figure 2B:
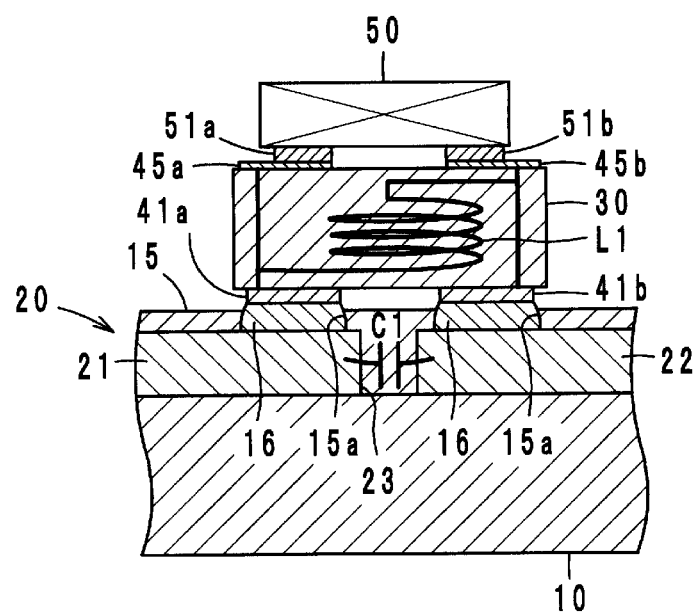

On the antenna conductor 20, an insulating protective film (hereinafter, referred to as a resist film 15) is provided. However, in FIGS. 1A and 1B and FIG. 2A, the resist film 15 is not shown. In addition, so as to electrically connect the first radiation element 21 and second radiation element 22 and the inductor substrate 30 to each other, aperture portions 15a are provided in the resist film 15 as illustrated in FIG. 2A. As illustrated in FIG. 2B, external electrodes 41a and 41b of the inductor substrate 30 are connected to the first radiation element 21 and the second radiation element 22 through the aperture portions 15a by soldering 16, for example.

As illustrated in FIG. 2B, the inductance element L1 is embedded in the inductor substrate 30. One end of the element L1 is connected to the first radiation element 21 and an input-output terminal electrode 51a of the wireless IC element 50, and the other end of the element L1 is connected to the second radiation element 22 and an input-output terminal electrode 51b of the wireless IC element 50.

The wireless IC element 50 preferably includes a clock circuit, a logic circuit, a memory circuit, and other suitable circuit, and stores necessary information therein. On the back surface of the wireless IC element 50, the input-output terminal electrodes 51a and 51b and mounting terminal electrodes (not illustrated) are provided. The input-output terminal electrodes 51a and 51b are electrically connected to power feeding terminal electrodes 45a and 45b provided on the top surface of the inductor substrate 30, respectively, by soldering, for example, and the mounting terminal electrodes are individually electrically connected to mounting terminal electrodes 45c and 45d (refer to FIG. 5) provided on the top surface of the inductor substrate 30 by soldering, for example.

Figure 3:
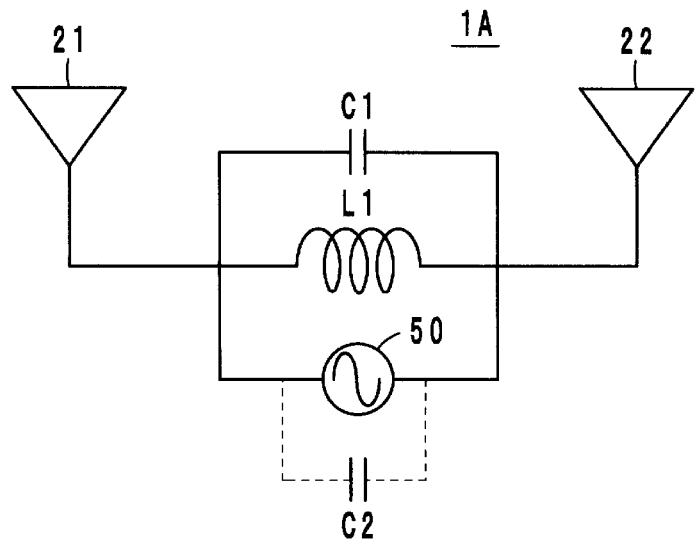
FIG. 3 is an equivalent circuit diagram of the wireless communication device according to the first preferred embodiment of the present invention.

The wireless communication device 1A has an equivalent circuit illustrated in FIG. 3, and the inductance element L1 embedded in the inductor substrate 30 and the wireless IC element 50 are connected to the first radiation element 21 and the second radiation element 22 so as to be connected in parallel to each other. Furthermore, a capacitor C1 which is provided in a portion (the slit 23) in which the radiation elements 21 and 22 face each other as illustrating in FIG. 2A, is also connected in parallel to the inductance element L1. Thus, a resonant circuit is provided. A capacitor C2 is preferably stray capacitance included in the wireless IC element 50. This stray capacitance C2 has a value greater than the capacitor C1 between the radiation elements 21 and 22. By providing the capacitor C1, the inductance value required for resonating can be reduced.

In the wireless communication device 1A having such a configuration as described above, the inductance element L1 transmits a high-frequency signal of a predetermined frequency sent out from the wireless IC element 50 to the first radiation element 21 and the second radiation element 22, and supplies a high-frequency signal received by the first radiation element 21 and the second radiation element 22 to the wireless IC element in a direction opposite to that at the time of sending out from the wireless IC element 50.

Figure 4:
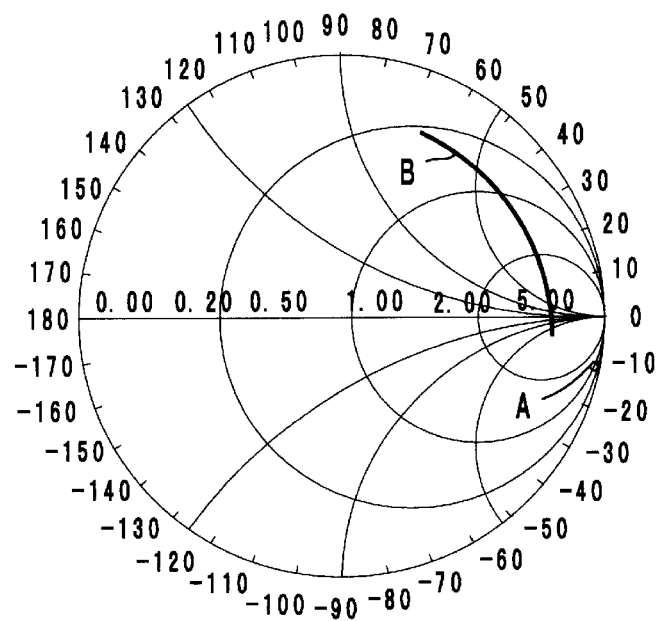
FIG. 4 is a Smith chart diagram illustrating an impedance matching characteristic of an inductor substrate in the wireless communication device according to the first preferred embodiment of the present invention.

The inductance element L1 defines and functions as a matching circuit to provide impedance matching between the wireless IC element 50 and the flexible antenna conductor 20. In other words, the wireless IC element 50 and the inductance element L1 define a closed-loop line, and the electrical length of the closed-loop line is closely related to impedance matching. The inductance matching characteristic of the inductance element L1 is illustrated in a Smith chart in FIG. 4. FIG. 4 illustrates impedance viewed from the terminal sides of the radiation elements 21 and 22. The input-output impedance of the wireless IC element 50 corresponds to portion A in FIG. 4, and impedance after conversion due to the inductance element L1 corresponds to a portion B. More specifically, impedance is matched due to a resonant circuit defined by the inductance element L1, the capacitor C1, and the stray capacitance C2 of the wireless IC element 50, illustrated in the equivalent circuit in FIG. 3, and is able to be finely adjusted due to the capacitors C1 and C2.

Furthermore, in the wireless communication device 1A, the first radiation element 21 and the second radiation element 22 are provided in substantially the entire region of one main surface of the flexible base material film 10, and the inductor substrate 30 is connected to the straight-line portions of the first radiation element 21 and the second radiation element 22 so as to cross the slit 23 provided between the first radiation element 21 and the second radiation element 22. Therefore, in connection portions between the inductor substrate 30 and the first and second radiation elements 21 and 22, there is no conductor, such as a loop-shaped conductor or a leading conductor, having a narrow line width. In other words, since only the radiation elements 21 and 22 are provided on the flexible base material film 10 in a surface shape, even if the wireless communication device 1A is folded or bent, disconnection is not likely to occur in the connection portions, and reliability is significantly improved.

In addition, it is not a problem that a protrusion portion is provided in facing portions of the first radiation element 21 and the second radiation element 22 to be connected to the external electrodes 41a and 41b of the inductor substrate 30.

In particular, in the wireless communication device 1A, since the surface of the antenna conductor 20 is covered by the resist film 15, a fold line is effectively prevented from being formed in the radiation element 21 or 22 when the device 1A is folded or bent, and furthermore, even if the fold line is formed, the fold line is effectively prevented from expanding. In addition, since the resist film 15 protects the antenna conductor 20 from an external environment and covers the slit 23, when the device 1A is bent or folded, the spacing of the slit 23 is prevented from fluctuating or the radiation elements are prevented from being in contact with each other.

It is preferable that the first radiation element 21 and the second radiation element 22 face each other through the slit 23 in a linear arrangement. The reason for this is that the value of the capacitor C1 in the slit 23 is prevented as much as possible from fluctuating as a result of folding or bending of the wireless communication device 1A. In addition, it is preferable that the length of the slit 23, namely, the length of a portion in which the first radiation element 21 and the second radiation element 22 face each other, is equal or substantially equal to at least three times the length of the wireless IC element 50 in the extending direction of the slit 23, for example. The reason for this is that when the wireless communication device 1A has been bent, the wireless IC element 50 is reliably protected, and it is less likely to cause disconnection in the connection portion.

As illustrated in FIG. 2B, the inductance element L1 is defined by a coiled conductor provided within the inductor substrate 30. The inductor substrate 30 preferably is a laminated substrate formed by laminating a plurality of insulator layers or dielectric layers. In particular, in the inductance element L1, the winding axis of the coiled conductor is disposed in a direction perpendicular or substantially perpendicular to the flexible antenna conductor 20. Furthermore, in a planar view, the inductance element L1 is disposed so that at least a portion of the coil inner diameter region of the coiled conductor overlaps with the slit 23. Due to such a configuration, a leakage flux from the inductor substrate 30 is blocked to a lesser extent by the antenna conductor 20, and a reduction of the Q value of the inductance element L1 is minimized. The most preferable arrangement is that, in planar view, the entire coil inner diameter region of the coiled conductor of the inductance element L1 is arranged so as to overlap with the slit 23.

When the wireless IC element 50 is a semiconductor chip such as silicon and the flexible base material 10 is a resin film, for example, it is preferable that the inductor substrate 30 is made of a material having a thermal expansion coefficient between that of the semiconductor chip and that of the resin film. As such a suitable material, ceramics, such as an LTCC, may preferably be used.

Figure 5:
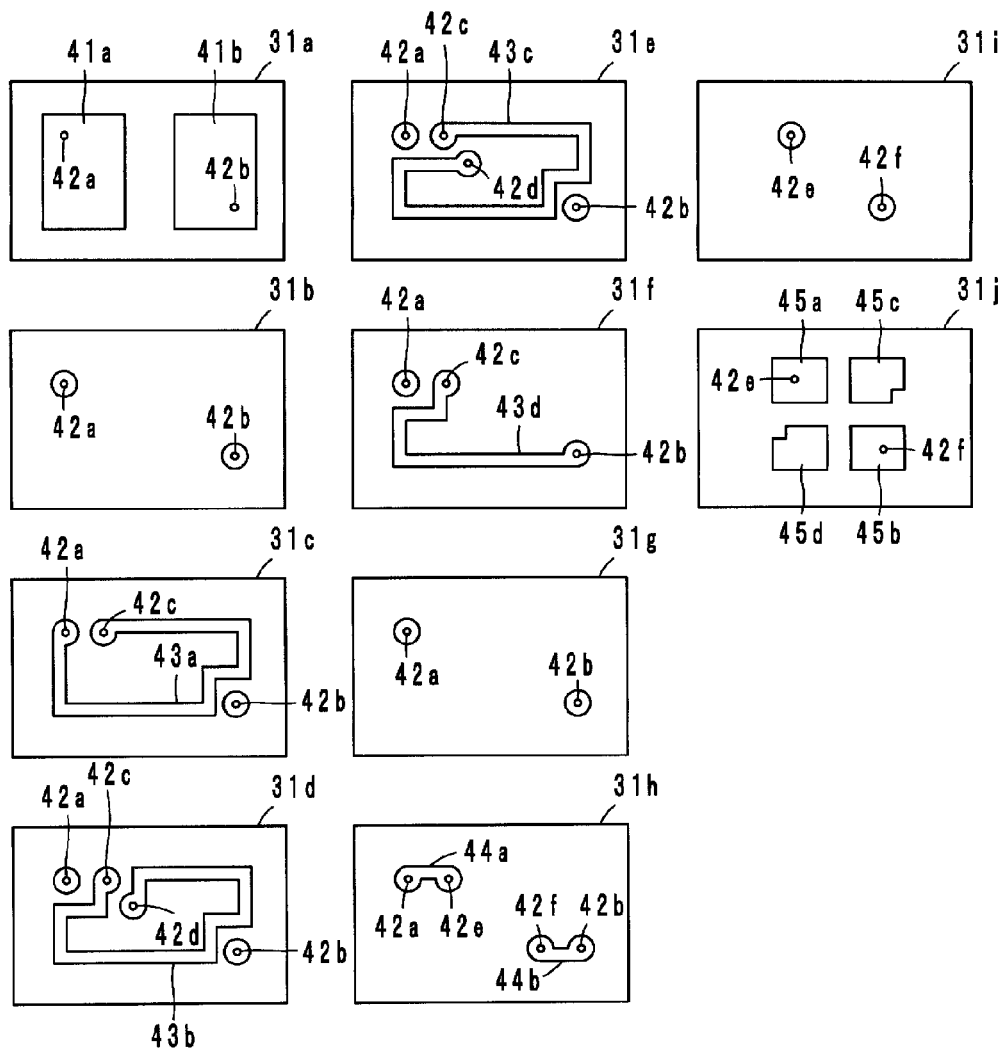
FIG. 5 is a plan view illustrating an inductor substrate (multilayer substrate) with the inductor substrate separated into individual base material layers.

Next, the structure of the inductor substrate 30 including the inductance element L1 embedded therein will be described with reference to FIG. 5. A laminated body includes individual base material layers 31a to 31j, the base material layers 31a to 31j are ceramic sheets including dielectric or magnetic substances, and the base material layer 31j is a transfer sheet. In FIG. 5, individual electrodes and individual conductors are provided on the individual base material layers 31a to 31j, and lamination is performed such that the base material layer 31a is disposed on the base material layer 31b and furthermore disposed on the base material layers 31c, 31d, . . . . The base material layer (transfer sheet) 31j, which is the lowermost layer, is peeled off after lamination, and thus, the terminal electrodes 45a to 45d are exposed on the bottom surface (which becomes a top surface when the laminated body is mounted as illustrated in FIG. 2B) of the laminated body.

Specifically, the external electrodes 41a and 41b to be connected to the first radiation element 21 and the second radiation element 22, and via hole conductors 42a and 42b are provided in the base material layer 31a. Via hole conductors 42a and 42b are provided in the base material layer 31b. Inductor conductors 43a to 43d and via hole conductors 42a to 42d are individually provided in the base material layers 31c to 31f. Via hole conductors 42a and 42b are provided in the base material layer 31g. Conductors 44a and 44b and via hole conductors 42a, 42b, 42e, and 42f are provided in the base material layer 31h. Via hole conductors 42e and 42f are provided in the base material layer 31i. The terminal electrodes 45a to 45d and via hole conductors 42e and 42f are provided in the base material layer 31j. The individual base material layers 31a to 31j are laminated, and thus, the inductance element L1 is defined by the inductor conductors 43a to 43d connected in a coil shape. Via hole conductors to which a same symbol is assigned are electrically connected between base material layers vertically adjacent to each other.

Second Preferred Embodiment

Figure 6:
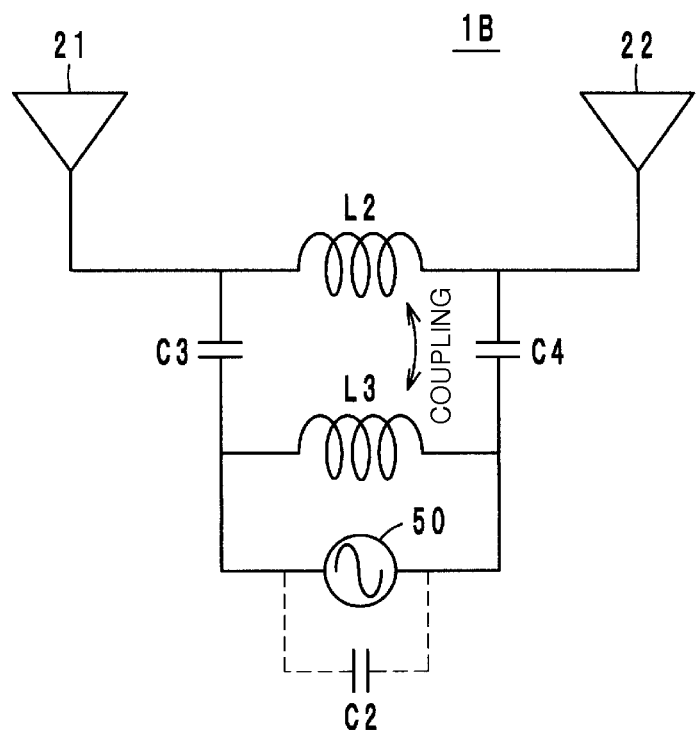
FIG. 6 is an equivalent circuit diagram of a wireless communication device according to a second preferred embodiment of the present invention.

A wireless communication device 1B according to a second preferred embodiment of the present invention has an equivalent circuit illustrated in FIG. 6, a resonant circuit is defined by inductance elements L2 and L3 and capacitance elements C3 and C4, and the inductance elements L2 and L3 are magnetically coupled to each other. The configuration of the wireless communication device 1B itself preferably is the same or substantially the same as the above-mentioned first preferred embodiment. The functional effect thereof is as described in the first preferred embodiment.

Figure 8:
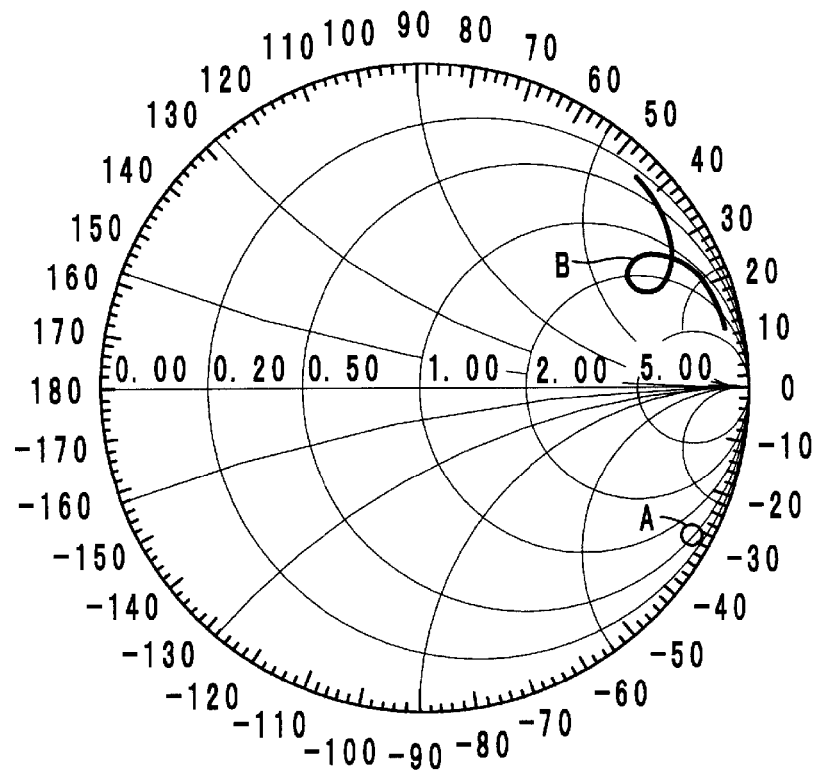
FIG. 8 is a Smith chart diagram illustrating an impedance matching characteristic of an inductor substrate in the wireless communication device according to the second preferred embodiment of the present invention.

In particular, in the second preferred embodiment, due to the resonant circuit defined by the inductance elements L2 and L3, the capacitance elements C3 and C4, and the stray capacitance C2 of the wireless IC element 50, communication can be effectively performed in a wide bandwidth. The inductance matching characteristic of the inductance elements L2 and L3 is illustrated in a Smith chart in FIG. 8. FIG. 8 illustrates impedance viewed from the terminal sides of the radiation elements 21 and 22. The input-output impedance of the wireless IC element 50 corresponds to a portion A in FIG. 8, and impedance after conversion due to the inductance elements corresponds to a portion B. The second preferred embodiment has an advantageous effect in that the capacitance elements C3 and C4 prevent static electricity (a low-frequency noise) input from the antenna conductor 20 from being transmitted to the wireless IC element 50, so as to define and function as a countermeasure against ESD.

Figure 9:
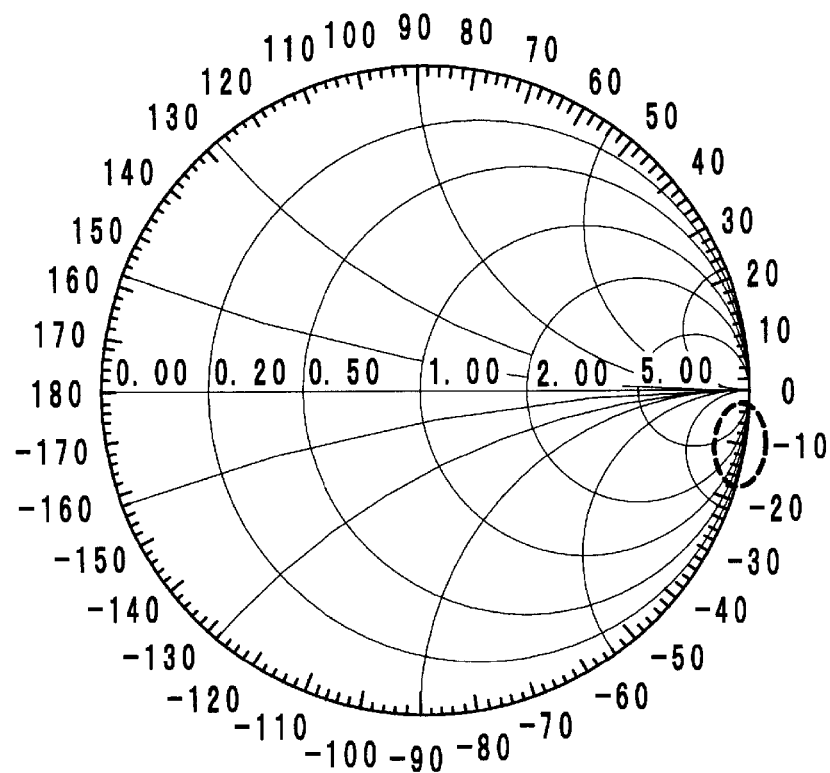
FIG. 9 is a Smith chart diagram illustrating an impedance characteristic (first example) of a radiation element in the wireless communication device according to the second preferred embodiment of the present invention.
Figure 10:
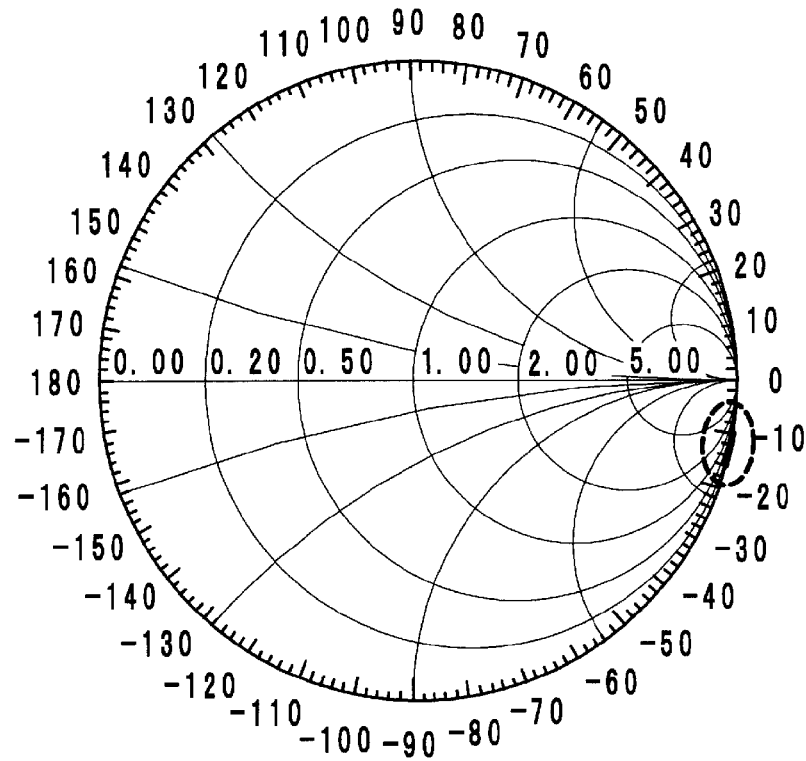
FIG. 10 is a Smith chart diagram illustrating an impedance characteristic (second example) of a radiation element in the wireless communication device according to the second preferred embodiment of the present invention.
Figure 11:
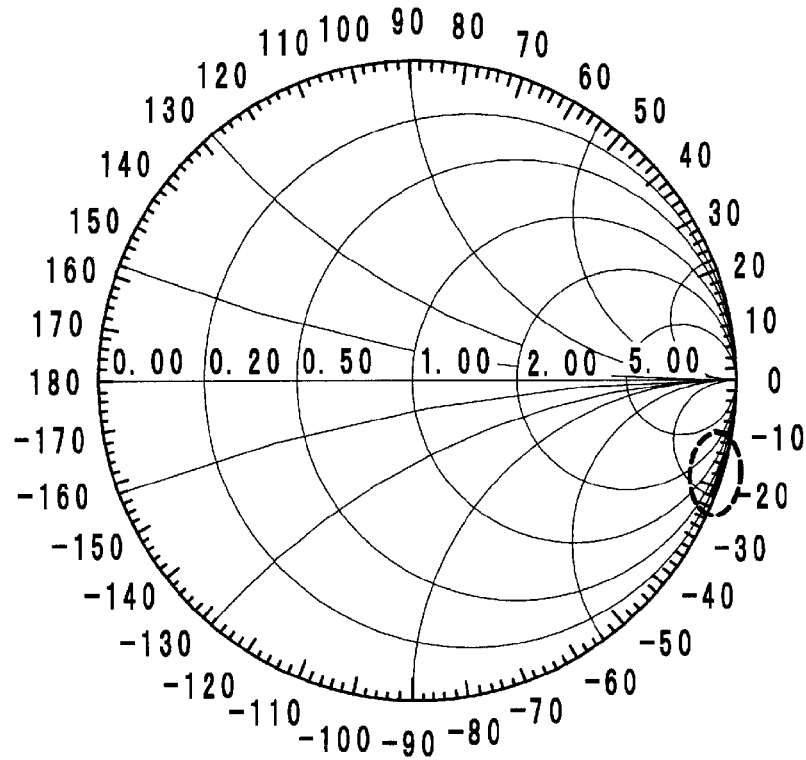
FIG. 11 is a Smith chart diagram illustrating an impedance characteristic (third example) of a radiation element in the wireless communication device according to the second preferred embodiment of the present invention.

In addition, the impedance of the antenna conductor 20 is illustrated in FIGS. 9 to 11. FIG. 9 illustrates the characteristic of the impedance when the size of each of the first and second radiation elements 21 and 22 is about 20 mm×about 6 mm in a 750 to 1050 MHz band, for example. FIG. 10 illustrates the characteristic of the impedance when the size of each of the first and second radiation elements 21 and 22 is about 40 mm×about 6 mm in the 750 to 1050 MHz band, for example. FIG. 11 illustrates the characteristic of the impedance when the size of each of the first and second radiation elements 21 and 22 is about 60 mm×about 6 mm in the 750 to 1050 MHz band, for example.

Figure 7:
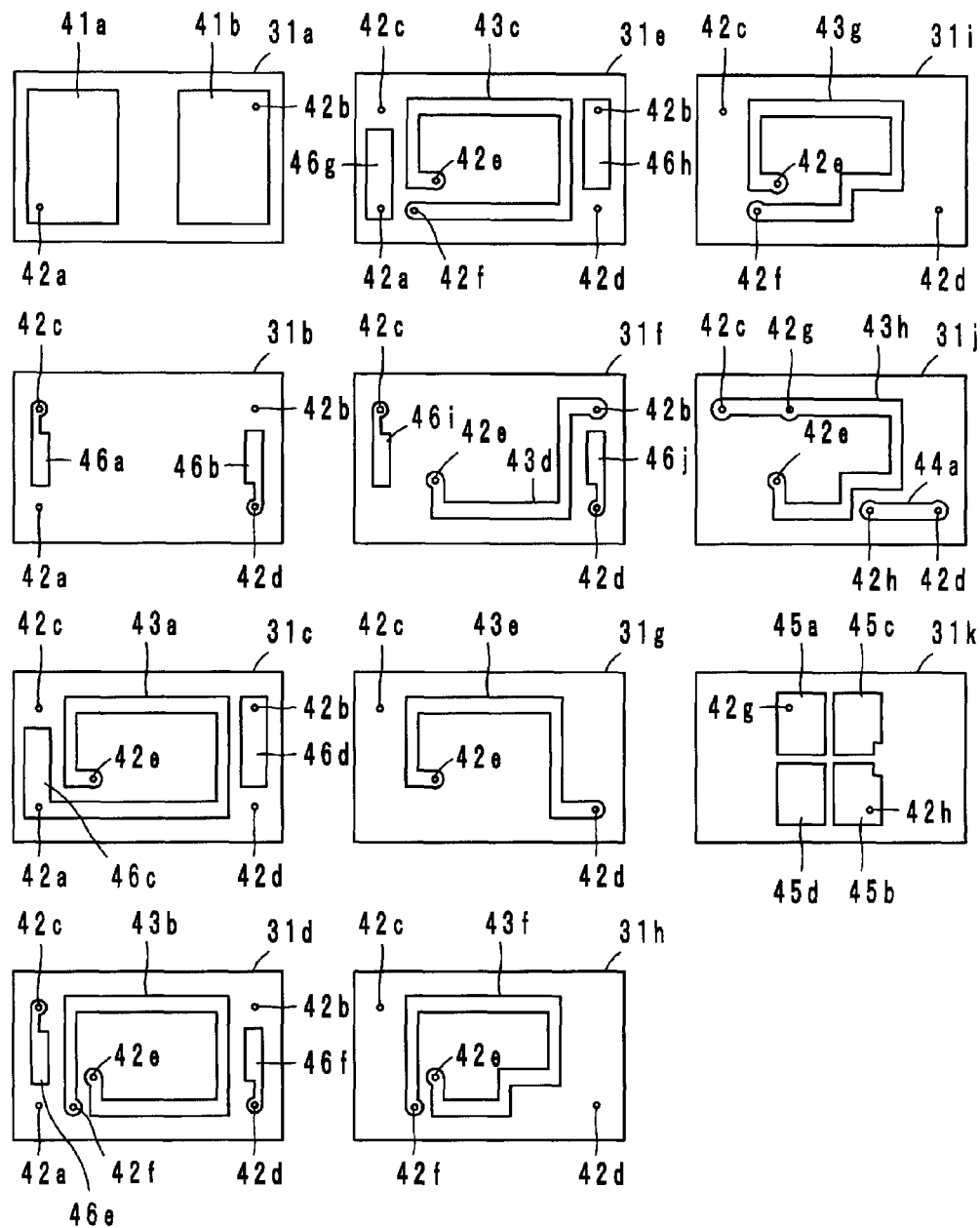
FIG. 7 is a plan view illustrating an inductor substrate (multilayer substrate) of the wireless communication device according to the second preferred embodiment of the present invention the inductor substrate separated into individual base material layers.

The structure of the inductor substrate 30 including the inductance elements L2 and L3 and the capacitance elements C3 and C4 embedded therein will be described with reference to FIG. 7. A laminated body includes individual base material layers 31a to 31k. The base material layers 31a to 31k are ceramic sheets including dielectric or magnetic substances, for example, and the base material layer 31k is a transfer sheet. In FIG. 7, individual electrodes and individual conductors are provided on the individual base material layers 31a to 31k, and lamination is performed such that the base material layer 31a is disposed on the base material layer 31b and furthermore is disposed on the base material layers 31c, 31d, . . . . The base material layer (transfer sheet) 31k, which is the lowermost layer, is peeled off after lamination, and thus, the terminal electrodes 45a to 45d are exposed on the bottom surface (which becomes a top surface when the laminated body is mounted as illustrated in FIG. 2B) of the laminated body.

Specifically, the external electrodes 41a and 41b to be connected to the first radiation element 21 and the second radiation element 22, and via hole conductors 42a and 42b are provided in the base material layer 31a. Electrodes 46a and 46b and via hole conductors 42a to 42d are provided in the base material layer 31b. Inductor conductors 43a to 43d, electrodes 46c to 46j, and via hole conductors 42a to 42e are individually provided in the base material layers 31c to 31f. Inductor conductors 43e to 43g and via hole conductors 42c to 42f are provided in the base material layers 31g to 31i. An inductor conductor 43h, a conductor 44a, and via hole conductors 42c to 42e, 42g, and 42h are provided in the base material layer 31j. The terminal electrodes 45a to 45d and via hole conductors 42g and 42h are provided in the base material layer 31k.

The individual base material layers 31a to 31k are laminated, and thus, the inductance element L2 is defined by the inductor conductors 43e to 43h connected in a coil shape, and the inductance element L3 is defined by the inductor conductors 43a to 43d connected in a coil shape. Furthermore, the electrodes 46a, 46c, 46e, 46g, and 46i that face each other define the capacitance element C3, and the electrodes 46b, 46d, 46f, 46h, and 46j that face each other define the capacitance element C4. Via hole conductors to which a same symbol is assigned are electrically connected between base material layers vertically adjacent to each other.

Third Preferred Embodiment

Figure 12:
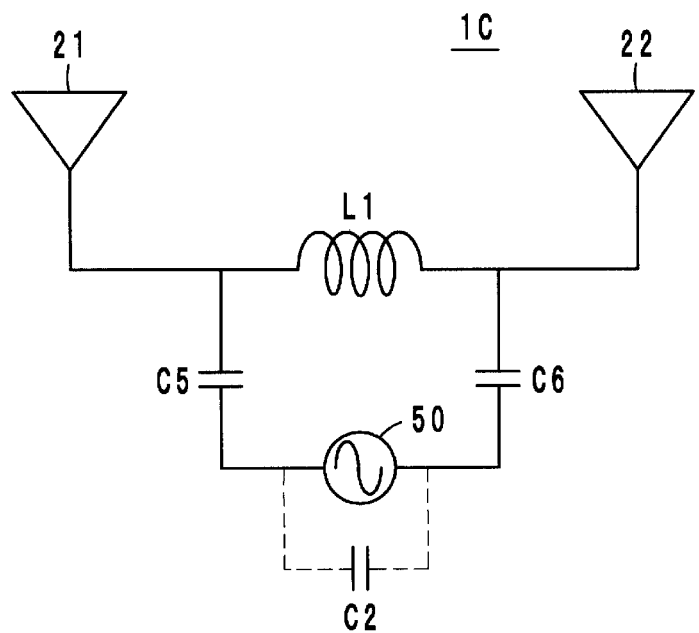
FIG. 12 is an equivalent circuit diagram of a wireless communication device according to a third preferred embodiment of the present invention.

A wireless communication device 1C according to a third preferred embodiment of the present invention has an equivalent circuit illustrated in FIG. 12, and a resonant circuit is defined by the inductance element L1 and capacitance elements C5 and C6. The configuration of the wireless communication device 1C itself preferably is the same or substantially the same as the above-mentioned first preferred embodiment. The functional effect thereof is as described in the first preferred embodiment. The capacitance elements C5 and C6 define and function as an impedance adjuster and also define and function as a countermeasure against ESD as described in the second preferred embodiment.

Figure 13:
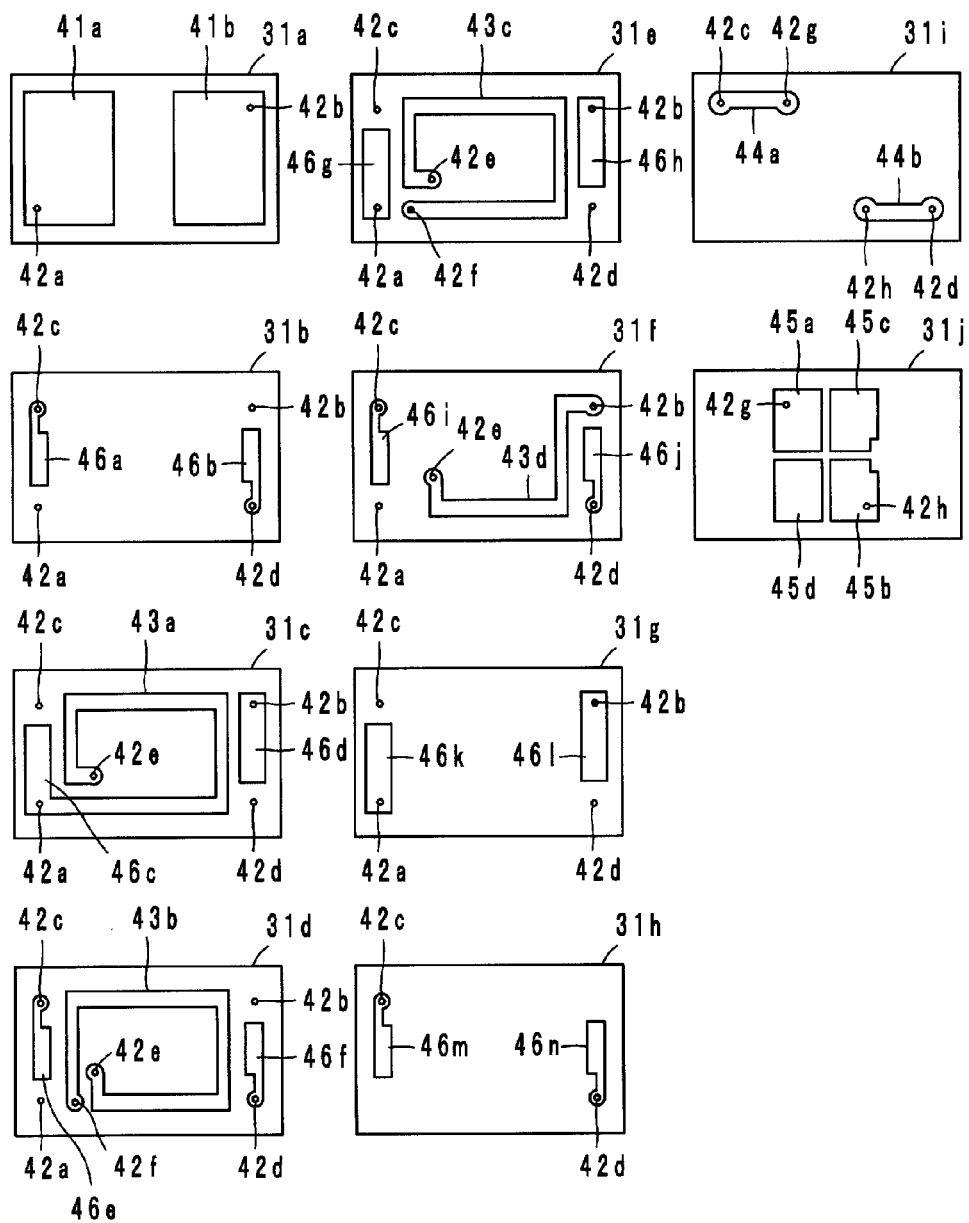
FIG. 13 is a plan view illustrating an inductor substrate (multilayer substrate) of the wireless communication device according to the third preferred embodiment of the present invention with the inductor substrate separated into individual base material layers.

The structure of the inductor substrate 30 including the inductance element L1 and the capacitance elements C5 and C6 embedded therein will be described with reference to FIG. 13. A laminated body includes individual base material layers 31a to 31j. The base material layers 31a to 31j are ceramic sheets including dielectric or magnetic substances, for example, and the base material layer 31j is a transfer sheet. In FIG. 13, individual electrodes and individual conductors are provided on the individual base material layers 31a to 31j, and lamination is performed such that the base material layer 31a is disposed on the base material layer 31b and furthermore is disposed on the base material layers 31c, 31d, . . . . The base material layer (transfer sheet) 31j, which is the lowermost layer, is peeled off after lamination, and thus, the terminal electrodes 45a to 45d are exposed on the bottom surface (which becomes a top surface when the laminated body is mounted as illustrated in FIG. 2B) of the laminated body.

Specifically, the external electrodes 41a and 41b to be connected to the first radiation element 21 and the second radiation element 22, and via hole conductors 42a and 42b are provided in the base material layer 31a. Electrodes 46a and 46b and via hole conductors 42a to 42d are provided in the base material layer 31b. Inductor conductors 43a to 43d, electrodes 46c to 46j, and via hole conductors 42a to 42e are individually provided in the base material layers 31c to 31f. Electrodes 46k to 46n and via hole conductors 42a to 42d are provided in the base material layers 31g and 31h. Conductors 44a and 44b and via hole conductors 42c, 42d, 42g, and 42h are provided in the base material layer 31i. The terminal electrodes 45a to 45d and via hole conductors 42g and 42h are provided in the base material layer 31j.

The individual base material layers 31a to 31j are laminated, and thus, the inductance element L1 is defined by the inductor conductors 43a to 43d connected in a coil shape. Furthermore, the electrodes 46a, 46c, 46e, 46g, 46i, 46k, and 46m that face each other define the capacitance element C5, and the electrodes 46b, 46d, 46f, 46h, 46j, 46l, and 46n that face each other define the capacitance element C6. Via hole conductors to which a same symbol is assigned are electrically connected between base material layers vertically adjacent to each other.

Fourth Preferred Embodiment

Figure 14A:
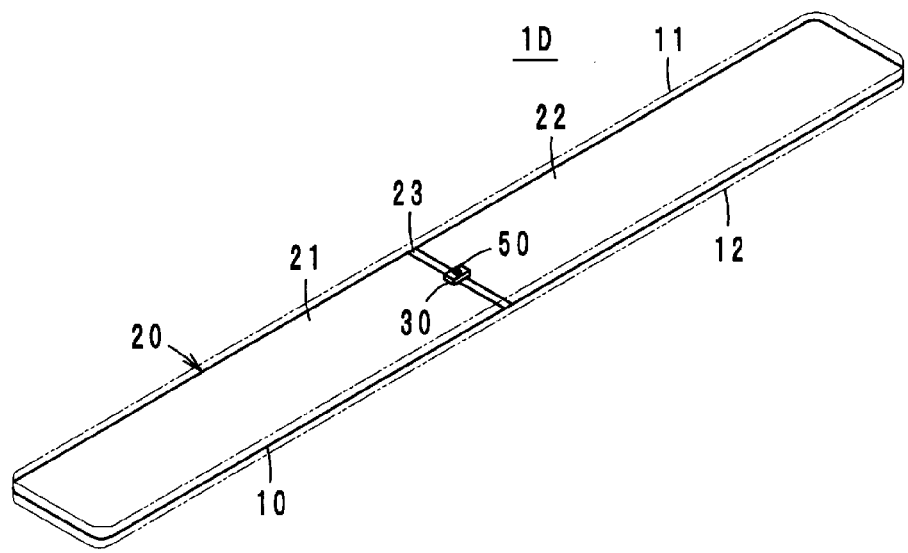
FIGS. 14A and 14B illustrate a wireless communication device according to a fourth preferred embodiment of the present invention, FIG. 14A being a perspective view, and FIG. 14B being an exploded perspective view.
Figure 14B:
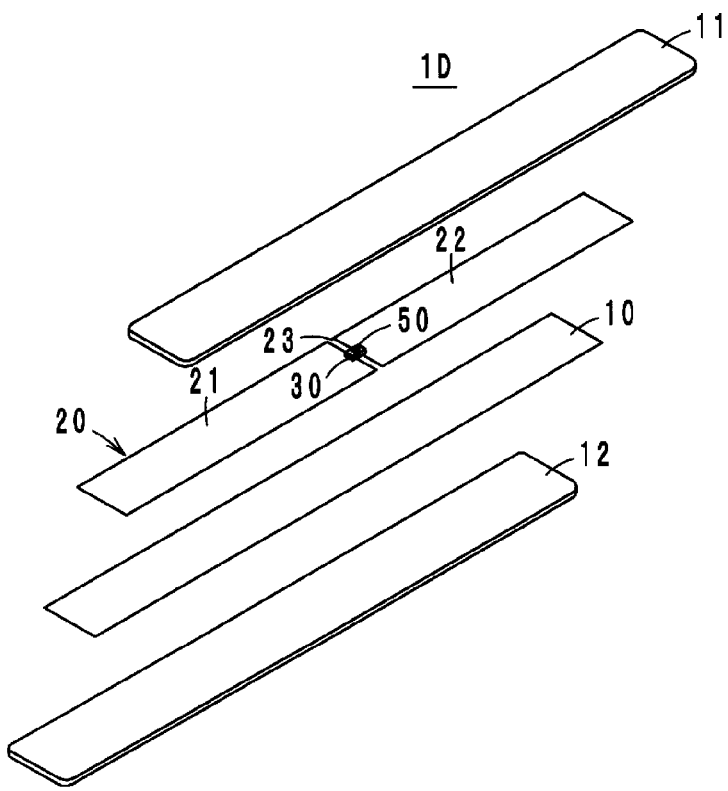

As illustrated in FIGS. 14A and 14B, a wireless communication device 1D according to a fourth preferred embodiment of the present invention is a wireless communication device in which the flexible antenna conductor 20 (the first radiation element 21 and the second radiation element 22) is provided on the flexible base material film 10, and the inductor substrate 30 in which the wireless IC element 50 is mounted is connected to the first radiation element 21 and the second radiation element 22. Furthermore, protective members 11 and 12 preferably including an elastomer, for example, are adhered to the front and back surfaces of the wireless communication device 1D. The configuration of the wireless communication device 1D itself preferably is the same or substantially the same as the first preferred embodiment.

Examples of Modifications to the Antenna Conductor

Figure 15A:
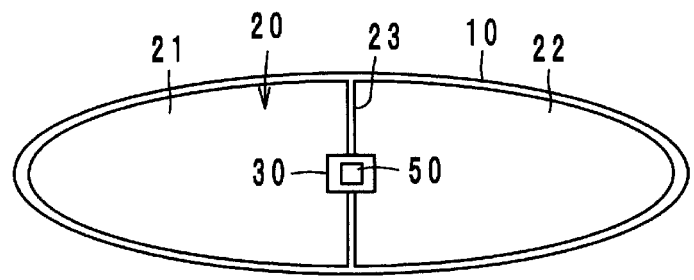
FIGS. 15A to 15C are plan views illustrating modifications to an antenna conductor according to a preferred embodiment of the present invention, FIG. 15A illustrating a first exemplary modification, FIG. 15B illustrating a second exemplary modification, and FIG. 15C illustrating a third exemplary modification.

The shape of the above-mentioned antenna conductor 20 (the first radiation element 21 and the second radiation element 22) is arbitrary, and may also be an elliptical or substantially elliptical shape in a planar view as illustrated as a first exemplary modification in FIG. 15A. As illustrated as a second exemplary modification in FIG. 15B, the antenna conductor 20 may also have, in a planar view, a rectangular or substantially rectangular shape in which a slit 23 is provided along a diagonal line to divide the antenna conductor 20 into the first radiation element 21 and the second radiation element 22. In addition, as illustrated as third exemplary modification in FIG. 15C, the slit 23 of the antenna conductor 20 may have a bent shape, for example. In each of the second and the third exemplary modifications, even if the flexible base material film 10 is bent in the lengthwise direction, it is possible to prevent a joint portion between the inductor substrate 30 and the antenna conductor 20 from being subjected to disconnection. The antenna conductor 20 may also have a shape other than those illustrated in FIG. 15, and for example, may be a circular or substantially circular shape.

Fifth Preferred Embodiment

Figure 16A:
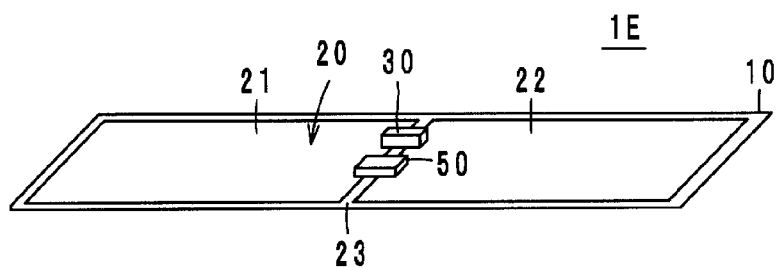
FIGS. 16A and 16B illustrate a wireless communication device according to a fifth preferred embodiment of the present invention, FIG. 16A being a perspective view, FIG. 16B being a plan view, and FIG. 16C being an enlarged cross-sectional view taken along the line B-B.
Figure 16B:
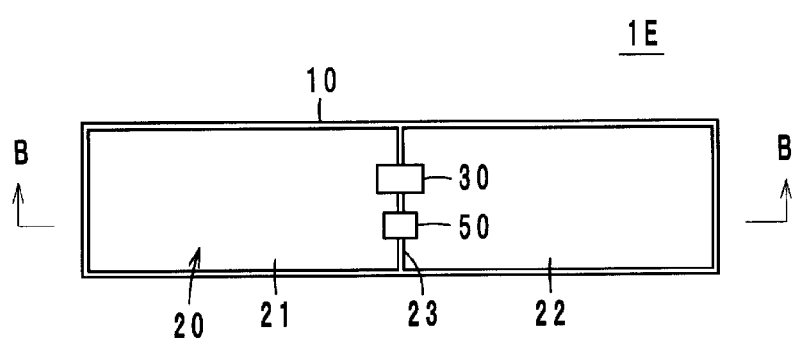
Figure 16C:
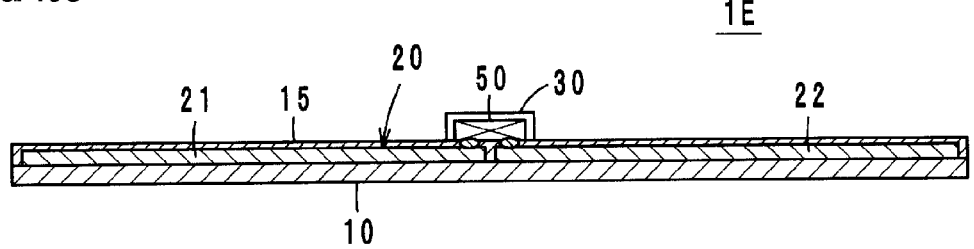
Figure 17A:
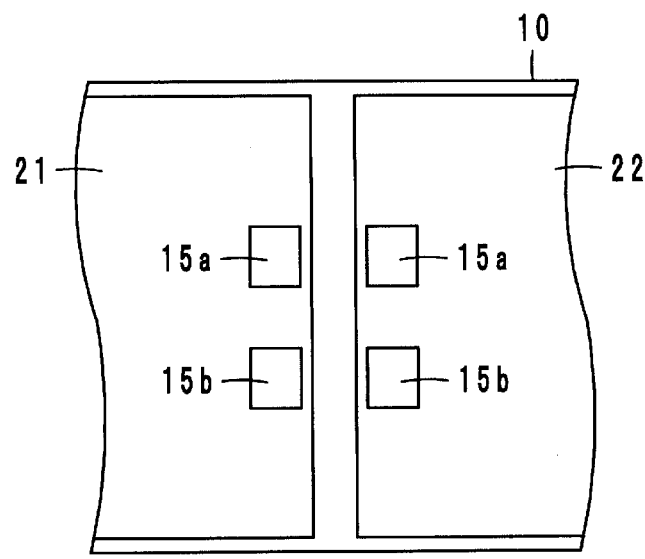
FIGS. 17A and 17B illustrate a main portion of the wireless communication device according to the fifth preferred embodiment of the present invention, each of FIGS. 17A and 17B being a plan view.
Figure 17B:
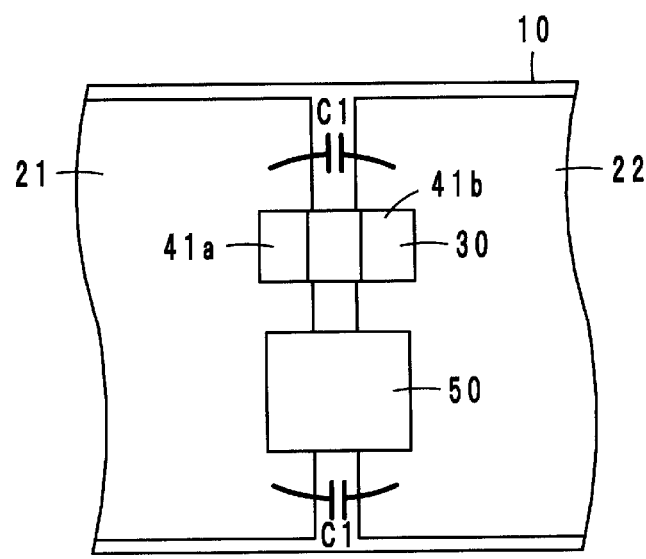

As illustrated in FIGS. 16A to 16C, a wireless communication device 1E according to a fifth preferred embodiment of the present invention is a wireless communication device in which each of the wireless IC element 50 and the inductor substrate 30 is connected onto the first radiation element 21 and the second radiation element 22 so as to cross the slit 23. In order to electrically connect the first radiation element 21 and the second radiation element 22 to the inductor substrate 30 and the wireless IC element 50, aperture portions 15a and 15b are provided in the resist film 15, as illustrated in FIG. 17A. The external electrodes 41a and 41b in the inductor substrate 30 are preferably connected to the first radiation element 21 and the second radiation element 22 through the aperture portion 15a by soldering, for example. In addition, in the fifth preferred embodiment, the external electrodes 41a and 41b are provided in both end portions of the inductor substrate 30 (refer to FIG. 17B and FIG. 19). The input-output terminal electrodes 51a and 51b of the wireless IC element 50 are connected to the first radiation element 21 and the second radiation element 22 through the aperture portion 15b by soldering, for example.

Figure 18:
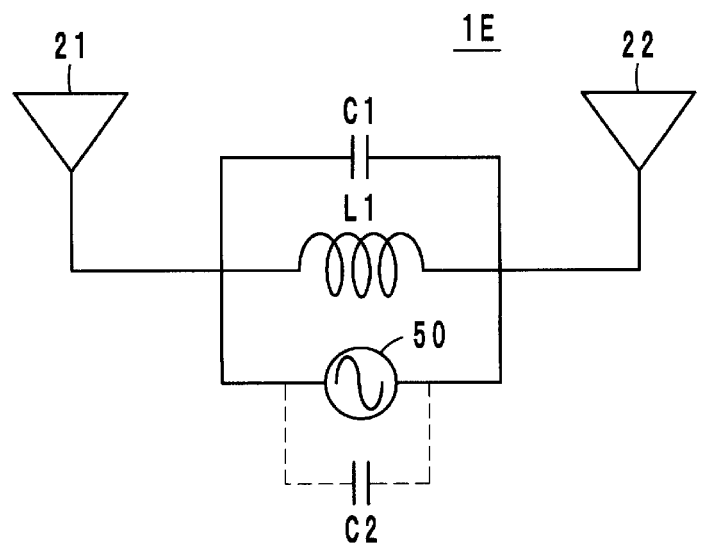
FIG. 18 is an equivalent circuit diagram of the wireless communication device according to the fifth preferred embodiment of the present invention.
Figure 19:
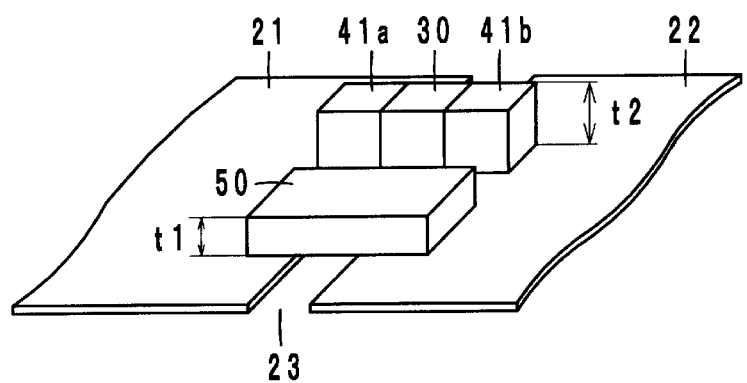
FIG. 19 is a perspective view illustrating a main portion of the wireless communication device according to the fifth preferred embodiment of the present invention.

The remaining configuration of the present fifth preferred embodiment preferably is the same or substantially the same as the first preferred embodiment, and the equivalent circuit thereof which is shown in FIG. 18, preferably is also the same or substantially the same as the equivalent circuit illustrated in FIG. 3. Accordingly, the functional effect of the fifth preferred embodiment is substantially the same as the first preferred embodiment. In particular, in the fifth preferred embodiment, as illustrated in FIG. 19, the height t2 of the inductor substrate 30 is preferably greater than the height t1 of the wireless IC element 50. In other words, the tall inductor substrate 30 is disposed adjacent to the low wireless IC element 50. When the wireless IC element 50 is a semiconductor chip, such as a silicon chip, for example, preferably the flexible base material 10 is a resin film, and the inductor substrate 30 is a laminated ceramic chip, the inductor substrate 30 is harder than the IC element 50. Therefore, if the tall and hard inductor substrate 30 is disposed adjacent to the wireless IC element 50, when an impact is applied to the wireless communication device 1E, the inductor substrate 30 protects the wireless IC element 50 from an external force.

Sixth Preferred Embodiment

Figure 20A:
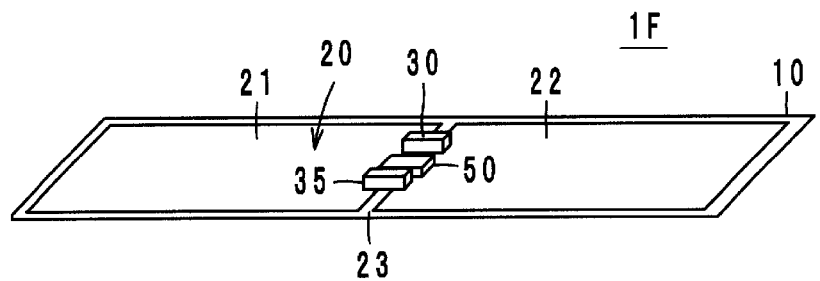
FIGS. 20A to 20C illustrate a wireless communication device according to a sixth preferred embodiment of the present invention, FIG. 20A being a perspective view, FIG. 20B being a plan view, and FIG. 20C being a perspective view of a main portion.
Figure 20B:
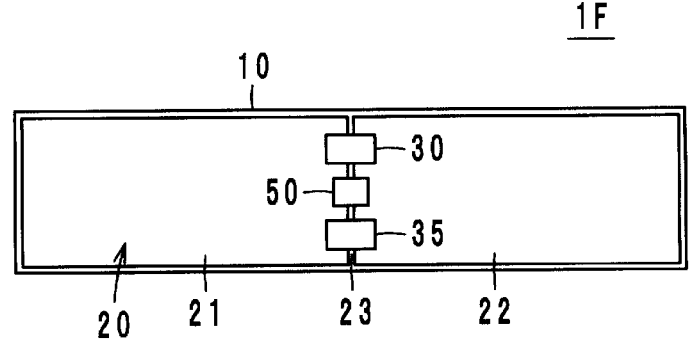
Figure 20C:
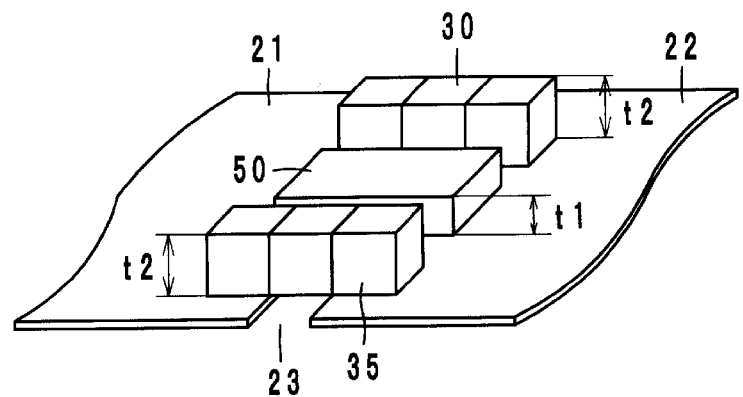

As illustrated in FIGS. 20A to 20C, a wireless communication device 1F according to a sixth preferred embodiment of the present invention is a wireless communication device including a wireless IC element 50 with a height of t1 that is disposed between the inductor substrate 30 with a height of t2 and a protective substrate 35 with a height of t2. The protective substrate 35 preferably includes the same or substantially the same material as the inductor substrate 30, and is hard. In this manner, with the hard substrates being disposed on both sides of the wireless IC element 50 adjacent thereto, the wireless IC element 50 is more reliably protected from an external impact applied thereto. In addition, for example, the protective substrate 35 may be a dummy substrate, or alternatively may have an inductance element or another capacitance element embedded therein.

Figure 21A:
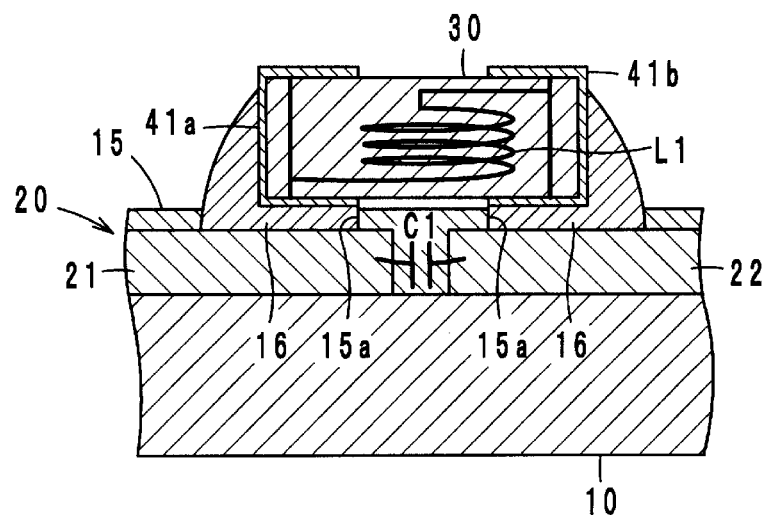
FIGS. 21A and 21B are cross-sectional views of an inductor substrate configuring the wireless communication device according to the sixth preferred embodiment of the present invention, FIG. 21A illustrating a first example, and FIG. 21B illustrating a second example.
Figure 21B:
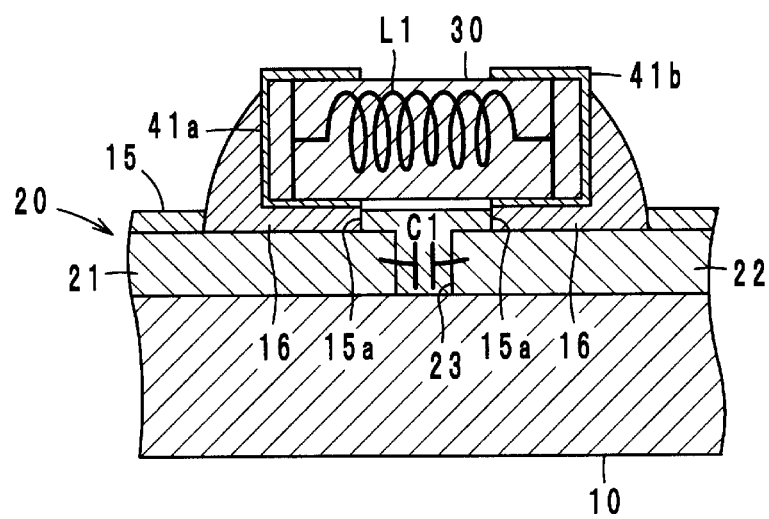

As illustrated in FIG. 21A, in the inductance element L1 embedded in the inductor substrate 30, the winding axis of a coiled conductor may be disposed in a direction perpendicular or substantially perpendicular to the flexible antenna conductor 20, or as illustrated in FIG. 21B, the winding axis of a coiled conductor may be disposed in the planar direction of the flexible antenna conductor 20. The advantage of the configuration in FIG. 21A is as described with reference to FIG. 2B in the first preferred embodiment. The advantage of the configuration in FIG. 21B is that stray capacitance occurring between the antenna conductor 20 and the coiled conductor is very small.

Modifications to the Antenna Conductor

Figure 15B:
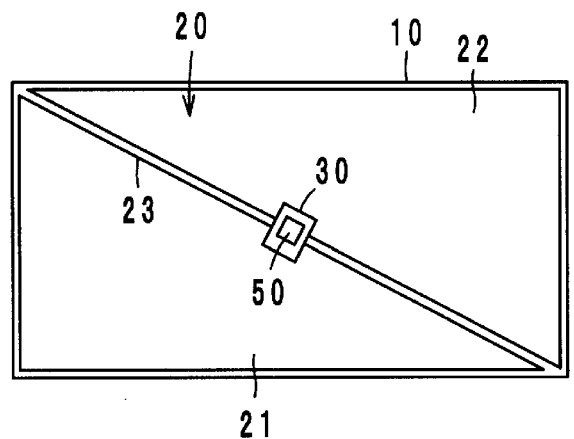
Figure 15C:
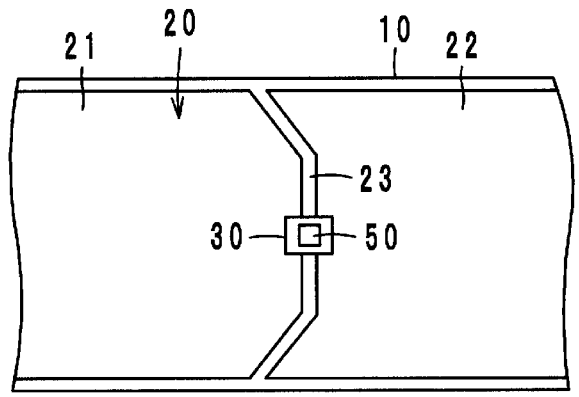
Figure 22A:
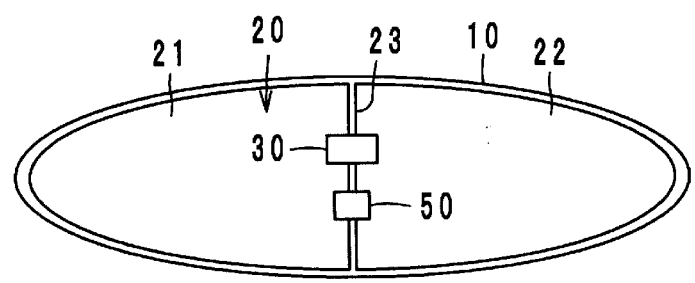
FIGS. 22A and 22B are plan views illustrating a modifications to an antenna conductor according to a preferred embodiment of the present invention, FIG. 22A illustrating a fourth exemplary modification, and FIG. 22B illustrating a fifth exemplary modification.
Figure 22B:
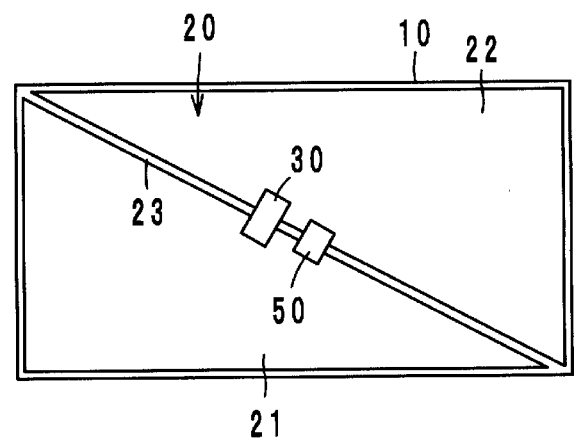

FIG. 22A illustrates fourth exemplary modification to the antenna conductor 20, and FIG. 22B illustrates a fifth exemplary modification to the antenna conductor 20. The fourth exemplary modification has the same or substantially the same shape as the first exemplary modification illustrated in FIG. 15A, and FIG. 22A illustrates a state in which each of the wireless IC element 50 and the inductor substrate 30 is connected to the first radiation element 21 and the second radiation element 22. The fifth exemplary modification preferably has the same or substantially the same shape as the second exemplary modification illustrated in FIG. 15B, and FIG. 22B illustrates a state in which each of the wireless IC element and the inductor substrate 30 is connected to the first radiation element 21 and the second radiation element 22.

Seventh Preferred Embodiment

Figure 23A:
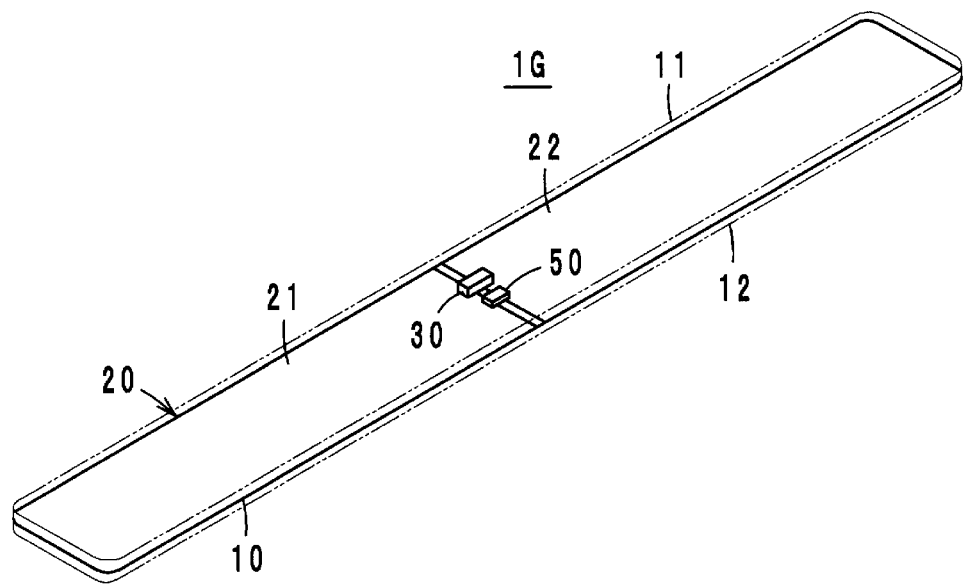
FIGS. 23A and 23B illustrate a wireless communication device according to a seventh preferred embodiment of the present invention, FIG. 23A being a perspective view, and FIG. 23B being an exploded perspective view.
Figure 23B:
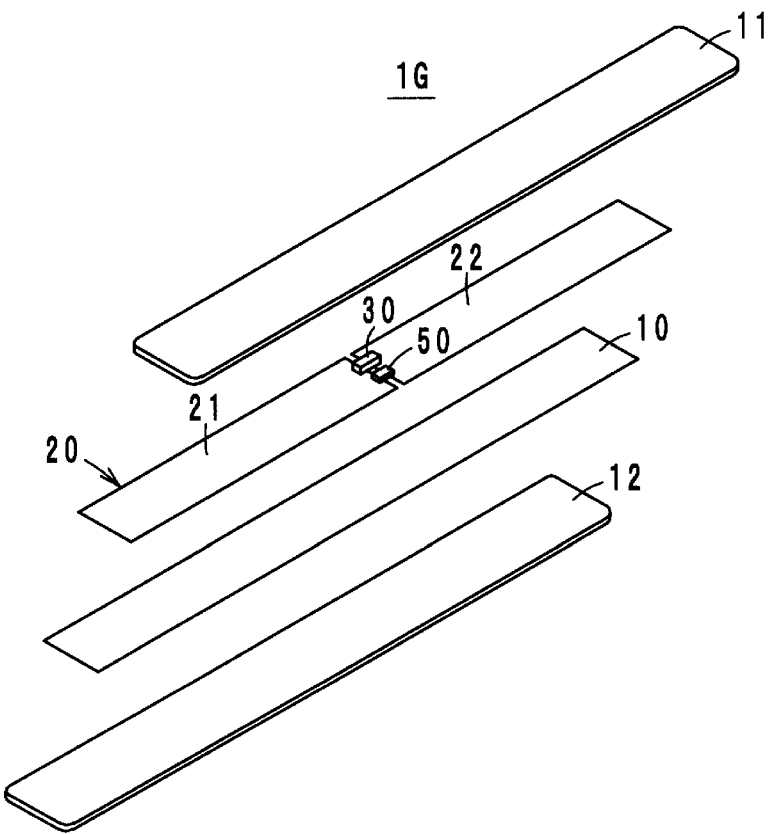

As illustrated in FIGS. 23A and 23B, a wireless communication device 1G according to a seventh preferred embodiment of the present invention is a wireless communication device in which the flexible antenna conductor 20 (the first radiation element 21 and the second radiation element 22) is provided on the flexible base material film 10, and each of the wireless IC element 50 and the inductor substrate 30 is connected to the first radiation element 21 and the second radiation element 22. Furthermore, the protective members 11 and 12 preferably including an elastomer, for example, are adhered to the front and back surfaces of the wireless communication device 1G. The configuration of the wireless communication device 1G itself preferably is the same or substantially the same as the above-mentioned fifth preferred embodiment.

In addition, wireless communication devices according to the present invention are not limited to the above-mentioned preferred embodiments, and it is to be noted that various modifications are possible without departing from the scope and spirit thereof.

As described above, preferred embodiments of the present invention are useful for a wireless communication device, and, in particular, have advantages in that disconnection is not likely to occur even when the device is folded or bent.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication device comprising:
   a flexible base material film;
   a flexible antenna conductor provided in substantially an entire region of one main surface of the flexible base material film and including a first radiation element and a second radiation element facing each other with a slit therebetween;
   an inductor substrate connected to the first radiation element and the second radiation element so as to extend across the slit, the inductor substrate including an inductance element; and
   a wireless IC element connected in parallel to the inductance element and mounted on or in the inductor substrate.

2. The wireless communication device according to claim 1, wherein
   an insulating protective film is provided in substantially the entire region of the one main surface of the flexible base material film so as to cover the first radiation element and the second radiation element; and
   the inductor substrate is connected to each of the first radiation element and the second radiation element through an aperture portion provided in the insulating protective film.

3. The wireless communication device according to claim 1, wherein the first radiation element and the second radiation element are capacitively coupled to each other through the slit.

4. The wireless communication device according to claim 1, wherein
   the inductor substrate is a laminated substrate including a plurality of insulator layers or dielectric layers that are laminated on one another; and
   the inductance element includes a coiled conductor provided within the laminated substrate.

5. The wireless communication device according to claim 4, wherein in the inductance element, a winding axis of the coiled conductor provided within the laminated substrate extends in a direction perpendicular or substantially perpendicular to the flexible antenna conductor.

6. The wireless communication device according to claim 5, wherein in a planar view, the inductor substrate is disposed so that at least a portion of a coil inner diameter region of the coiled conductor overlaps with the slit.

7. The wireless communication device according to claim 4, wherein in the inductance element, a winding axis of the coiled conductor provided within the laminated substrate extends in a planar direction of the flexible antenna conductor.

8. A wireless communication device comprising:
a flexible base material film;
a flexible antenna conductor provided in substantially an entire region of one main surface of the flexible base material film and including a first radiation element and a second radiation element facing each other with a slit therebetween;
an inductor substrate connected to the first radiation element and the second radiation element so as to extend across the slit, the inductor substrate including an inductance element; and
a wireless IC element connected to the first radiation element and the second radiation element so as to extend across the slit and connected in parallel to the inductance element.

9. The wireless communication device according to claim 8, wherein
an insulating protective film is provided in substantially the entire region of the one main surface of the flexible base material film so as to cover the first radiation element and the second radiation element; and
the inductor substrate is connected to each of the first radiation element and the second radiation element through an aperture portion provided in the insulating protective film, and the wireless IC element is connected to each of the first radiation element and the second radiation element through an aperture portion provided in the insulating protective film.

10. The wireless communication device according to claim 8, wherein the first radiation element and the second radiation element are capacitively coupled to each other through the slit.

11. The wireless communication device according to claim 8, wherein
the inductor substrate is a laminated substrate including a plurality of insulator layers or dielectric layers that are laminated on one another; and
the inductance element includes a coiled conductor provided within the laminated substrate.

12. The wireless communication device according to claim 11, wherein in the inductance element, a winding axis of the coiled conductor provided within the laminated substrate extends in a direction perpendicular or substantially perpendicular to the flexible antenna conductor.

13. The wireless communication device according to claim 12, wherein in a planar view, the inductor substrate is disposed so that at least a portion of a coil inner diameter region of the coiled conductor overlaps with the slit.

14. The wireless communication device according to claim 11, wherein in the inductance element, a winding axis of the coiled conductor provided within the laminated substrate extends in a planar direction of the flexible antenna conductor.

15. The wireless communication device according to claim 8, wherein the inductor substrate is taller than the wireless IC element.

16. The wireless communication device according to claim 8, wherein a protective substrate taller than the wireless IC element is mounted on the flexible base material film in such a manner as to cross the slit and so that the wireless IC element is located between the protective substrate and the inductor substrate.

17. The wireless communication device according to claim 16, wherein the protective substrate is an inductor substrate including an inductance element.

18. The wireless communication device according to claim 8, wherein the wireless IC element is directly connected to the first radiation element and to the second radiation element so as to extend across the slit and is connected in parallel to the inductance element.

19. The wireless communication device according to claim 8, wherein the wireless IC element is spaced apart from the inductor substrate along a direction in which the slit extends.

* * * * *